(12) United States Patent
Liao et al.

(10) Patent No.: US 10,296,640 B1
(45) Date of Patent: *May 21, 2019

(54) VIDEO SEGMENTS FOR A VIDEO RELATED TO A TASK

(71) Applicant: Google Inc., Mountain View, CA (US)

(72) Inventors: Kerwell Liao, San Francisco, CA (US); Nikhil Sharma, Mountain View, CA (US); LaDawn Risenmay Jentzsch, Mountain View, CA (US); Jennifer Ellen Fernquist Seth, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 566 days.

This patent is subject to a terminal disclaimer.

(21) Appl. No.: 15/055,000

(22) Filed: Feb. 26, 2016

Related U.S. Application Data

(63) Continuation of application No. 13/927,533, filed on Jun. 26, 2013.

(51) Int. Cl.
*G06F 17/30* (2006.01)
*G06F 3/0481* (2013.01)

(52) U.S. Cl.
CPC ...... *G06F 17/3079* (2013.01); *G06F 17/3082* (2013.01); *G06F 17/30867* (2013.01); *G06F 3/0481* (2013.01); *G06F 17/30011* (2013.01); *G06F 17/30781* (2013.01); *G06F 17/30784* (2013.01); *G06F 17/30817* (2013.01); *G06F 17/30837* (2013.01); *G06F 17/30846* (2013.01); *G06F 17/30849* (2013.01); *G06F 17/30864* (2013.01)

(58) Field of Classification Search
CPC ............ G06F 3/0481; G06F 17/30011; G06F 17/30781; G06F 17/30817; G06F 17/30864; G06F 17/30784; G06F 17/30849; G06F 17/30846; G06F 17/30837; G06F 17/3079; G06F 17/3082; G06F 17/30867
See application file for complete search history.

(56) References Cited

U.S. PATENT DOCUMENTS

| | | | |
|---|---|---|---|
| 6,032,151 A | | 2/2000 | Arnold et al. |
| 9,304,648 B2* | | 4/2016 | Liao ................... G06F 17/3079 |
| 2003/0011629 A1 | | 1/2003 | Rouse et al. |
| 2007/0071323 A1 | | 3/2007 | Kontsevich et al. |
| 2007/0118873 A1 | | 5/2007 | Houh et al. |
| 2012/0323891 A1 | | 12/2012 | Jacobson et al. |

* cited by examiner

*Primary Examiner* — Ting Z Lee
(74) *Attorney, Agent, or Firm* — Middleton Reutlinger

(57) ABSTRACT

Methods and apparatus related to identifying a video for completing a task and determining a plurality of video segments of the identified video based on one or more attributes of the task. A task and a plurality of how-to videos related to the task may be identified. A how-to video may be selected and a plurality of video segments of the selected how-to video may be determined. One or more video segments may be associated with one or more task attributes that relate to performing the task. The selected video may be provided to a user and segmented, indexed, and/or annotated based on the associated video segments. In some implementations a given object utilized in performing the task may be identified and one or more video segments corresponding to the given object may be identified and/or provided to the user.

20 Claims, 8 Drawing Sheets

| Query Number | How-to Query | Inquiry Term(s) | Task Term(s) |
|---|---|---|---|
| 1 | how to change a flat tire | how to | "change", "flat tire" |
| 2 | how can I change a tire step by step? | how can I | "change", "tire", "step by step" |
| 3 | how do I change a tire | how do I | "change", "tire" |
| 4 | changing a tire? | ? | "changing", "tire" |
| 5 | change a flat | Missing prefix | "change", "flat" |
FIG. 2
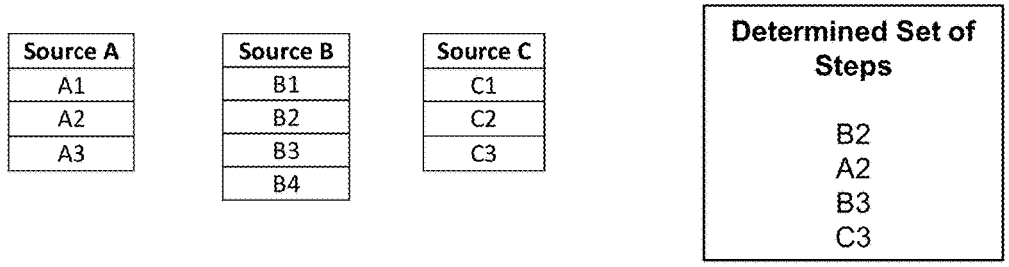
FIG. 3
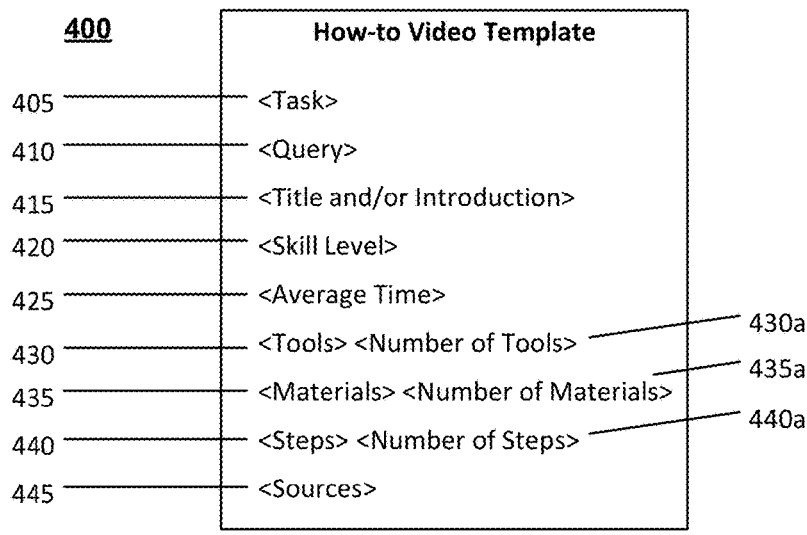
FIG. 4

| Task | Task Attributes | | Video Segment |
|---|---|---|---|
| How do I change a car's tire? | Title | How to change a car's flat tire | |
| | Skill level | A person of driving age | |
| | Average Time required | 25 minutes | |
| | Tools Needed | Jack, Wrench | |
| | Materials Needed | Operator's Manual, Spare Tire | |
| | Set of steps | Determined set of steps | |
| | | Step I | Turn the car's hazard lights on |  |
| | | Step II | Park on a level surface |  |
| | | Step III | Position the jack under a flat portion of the chassis close to the flat tire |  |
| | | Step IV | Turn the jack's lever to raise the car until the flat tire does not touch the ground |  |
| | | Step V | Use a wrench to unscrew the tire screws |  |
| | | Step VI | Remove the flat tire |  |
| | | Step VII | Position the spare tire so that the holes match the screws |  |
| | | Step VIII | Use a wrench to screw the tire screws until tight |  |
| | | Step IX | Gently lower the car by turning the jack's lever until the jack can be removed |  |
| | | Step X | Place flat tire and all tools in the car's trunk |  |
| | Sources | Tire Company A, Tire company B, Car Manufacturer 1, Car Manufacturer 2 | |

VIDEO SEGMENTS FOR A VIDEO RELATED TO A TASK

BACKGROUND

This specification is directed generally to identifying a video for completing a task and determining a plurality of video segments of the identified video based on one or more attributes of the task.

Users often search for step-by-step instructions on how to perform a task and may be presented with multiple sources of information related to performing the task.

SUMMARY

The present disclosure is directed to methods and apparatus for identifying a video for completing a task and determining a plurality of video segments of the identified video based on one or more attributes of the task. A how-to query related to performing a task and a plurality of how-to videos related to the how-to query may be identified. A how-to video may be selected based on analysis of the plurality of how-to videos that are related to the how-to query, such as determining a confidence measure for the plurality of how-to videos. A plurality of video segments of the how-to video may be determined. One or more video segments may be associated with one or more task attributes that relate to performing the task. The selected video may be associated with the video segments in a database. The selected video for completing a task may be provided to a user and segmented, indexed, and/or annotated based on the associated video segments. The selected video may be provided in response to a how-to query being submitted by the user and/or in response to other actions of the user. The one or more video segments may be utilized to enable the user to navigate the video. In some implementations a given object utilized in performing the task may be identified and one or more video segments corresponding to the given object may be identified and/or provided to the user. In some implementations such one or more video segments may be overlaid over the given object to enable the user to perform at least a portion of the task.

In some implementations a computer implemented method may be provided that includes the steps of: identifying a task; identifying a plurality of how-to videos related to the task; determining a confidence measure for each of one or more of the plurality of how-to videos; selecting a how-to video from the plurality of how-to videos based on the confidence measure; determining a plurality of video segments of the how-to video; identifying task attributes included in the selected how to video, each of the task attributes related to one or more aspects of the task; and associating, for each of one or more of the video segments, one or more task attributes with the video segment.

This method and other implementations of technology disclosed herein may each optionally include one or more of the following features.

In some implementations the task attributes may include steps to perform the task. In some implementations determining the plurality of video segments of the how-to video may include determining a first video segment of the video segments based on presence of a first step in the first video segment and determining a second video segment of the video segments based on presence of a second step in the second video segment. The method may further comprise associating the first step with the first video segment and associating the second step with the second video segment.

In some implementations the task attributes may be determined from a task template for the task.

In some implementations the task attributes may include at least one of a task title, a skill level to perform the task, an amount of time required to perform the task, an amount of time required to perform a portion of the task, tools related to the task, materials related to the task, and steps to perform the task.

In some implementations determining the confidence measure for a given how-to video in the plurality of how-to videos may be based on one or more of a ranking of the given how-to video, frequency of views of the given how-to video, number of web-links to the given how-to video, video characteristics of the given how-to video, and user feedback related to the given how-to video.

In some implementations determining the plurality of video segments of the how-to video includes identifying transitional indicators of the selected how-to video, each transitional indicator indicative of a transition from one of the video segments to another of the video segments. In some implementations the transitional indicators may be determined based on one or more of video of the how-to video, audio of the how-to video, and text that is based on the video or the audio.

The method may further comprise determining relevance of one or more of the task attributes to the task, and the determination of the confidence measure for a given how-to video in the plurality of how-to videos may be based on the determined relevance.

The method may further comprise identifying a template indicative of desired contents of the how-to videos, and the determination of the confidence measure for a given video of the how-to videos may include comparing the given video to the template. The template may be indicative of desired task attributes of the how to videos. Comparing the given video to the template may include determining given task attributes of the given video and determining similarity between the given task attributes and the desired task attributes. The method may further comprise identifying a plurality of sources responsive to the task; and determining the desired task attributes based on the plurality of sources. In some implementations the template may be indicative of desired progression of the how to videos and the comparing the given video to the template may include determining a given progression of the given video and determining similarity between the given progression and the desired progression.

In some implementations identifying the plurality of how-to videos may include identifying at least one of audio of the how-to video and text that is based on the how-to video.

In some implementations identifying the task may be based on identifying a how-to query associated with the task. In some implementations identifying the how-to videos associated with the task may include identifying the plurality of how-to videos from search results responsive to the how-to query.

In some implementations each of the video segments may be an identifier of a certain portion of the selected how-to video and the method may further comprise flagging the how-to video based on the video segments to enable navigation between the video segments within the how-to video.

In some implementations each of the video segments may be an additional video based on the how-to video, and each of the additional videos may include one or more portions the selected video.

The method may further comprise receiving a submitted query associated with the task and providing one or more of the video segments in response to the submitted query. In some implementations the submitted query may include one or more images. In some implementations providing the video segments may include overlaying images based on one of the video segments onto an object utilized to perform the task. The method may further comprise: receiving at least one image including the object; identifying the object; identifying the one video segment based on an associated attribute of the one video segment identifying the object; and determining the images based on the one video segment. In some implementations the images may include a portion of the how-to video that is associated with the one video segment. The method may further comprise: identifying a plurality of additional sources responsive to the task; determining additional task attributes related to one or more aspects of the task based on the plurality of additional sources, the additional task attributes may be distinct from the task attributes included in the selected how-to video; and providing information related to the additional task attributes in combination with the one or more video segments in response to the submitted query.

The method may further comprise identifying a plurality of additional sources responsive to the task, and determining a set of task attributes related to one or more aspects of the task based on the plurality of additional sources. Identifying the task attributes included in the selected how-to video may include determining the task attributes included in the selected how-to video based on matching one or more of the task attributes from the set of task attributes to the how to video.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein select a how-to video to perform a task and determine video segments of the selected how-to video. Particular implementations of the subject matter described herein may associate the video segments with task attributes related to the task. Particular implementations of the subject matter described herein may associate the selected how-to video with the video segments in a database. Particular implementations of the subject matter described herein may provide one or more of the plurality of video segments in response to a how-to-query or other actions of the user.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIG. 2 is an example table illustrating the identification of how-to queries.

FIG. 3 is an example illustrating the identification of one or more steps to perform a task from a plurality of sources.

FIG. 4 is an example illustrating a template for a task.

FIG. 5 is an example display of determined video segments and task attributes for a how-to video.

DETAILED DESCRIPTION

Technology described herein is useful in identifying a video for completing a task and determining a plurality of video segments of the identified video based on one or more attributes of the task and associating the video segments with the task. One or more video segments may be associated with one or more task attributes that relate to performing the task. The identified video for completing the task may be associated with the video segments in a database. The identified video may be provided to the user in response to a how-to query or other actions of the user. One or more of the plurality of video segments may be utilized to enable the user to navigate the selected video. In some implementations a given object utilized in performing the task may be identified and one or more of the plurality of video segments corresponding to the given object may be identified and/or provided to the user. In some implementations such one or more video segments may be overlaid over the object to enable the user to perform at least a portion of the task.

Figure 1:
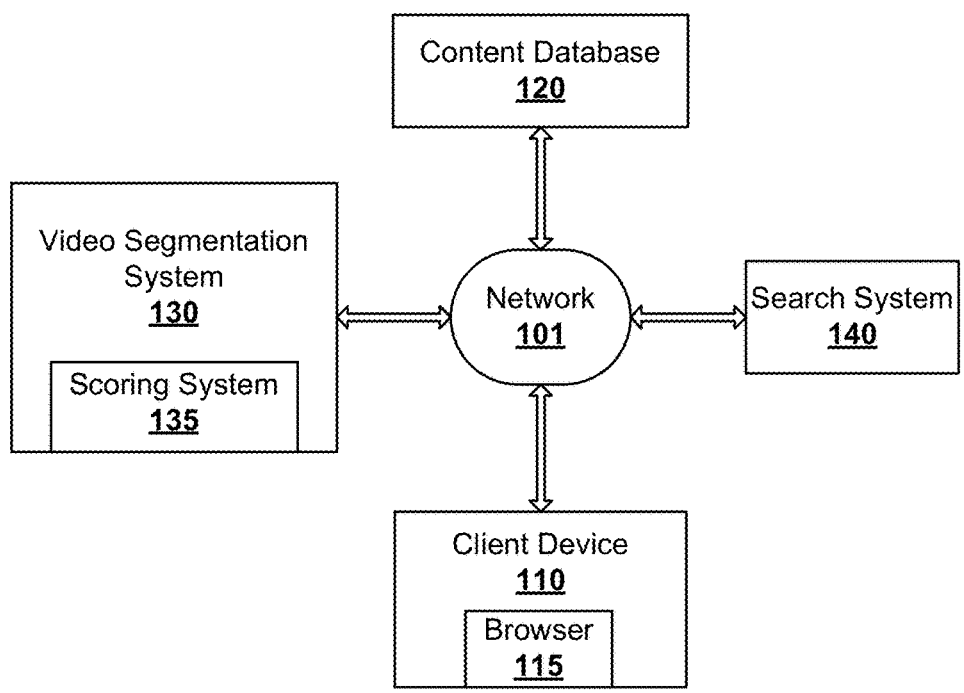
FIG. 1 is a block diagram of an example environment in which a plurality of video segments may be determined.

FIG. 1 illustrates a block diagram of an example environment 100 in which a plurality of video segments may be determined. The example environment 100 includes a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment 100 may also include a client device 110, a content database 120, a video segmentation system 130, and a search system 140. The client device 110 may execute one or more applications, such as a web browser 115. The client device 110 may be, for example, a desktop computer, a laptop, a tablet computer, a mobile phone, a tablet computing device, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device). Additional and/or alternative computing devices of the user may be provided. In some implementations the video segmentation system 130 may include a scoring system 135. In some environments the video segmentation system 130 and the scoring system 135 may be separate components of the environment.

In some implementations a task may be identified based on a query submitted by a user and/or one or more actions of the user. For example, the user may issue a search query via client device 110. In some implementations the search system 140 may receive the search query and the video segmentation system 130 may identify the search query as a desire for information on how to perform a task related to the search query. For example, the user may issue a search query for information on how to lose weight, on how to cook a particular dish, on how to repair a hole in the drywall, on how to change a car's engine oil, and so forth. In some implementations the task may be identified based on one or more actions of the user. For example, the user may be replacing a flat tire and an image capturing device in a wearable client device 110 worn by the user may identify a flat tire and a jack. The search system 140 may receive such information and search a database such as content database 120 to identify an association between the flat tire and the jack. Based at least in part on such association the search system 140 may identify the task as being that of changing the car's tire.

In some implementations a task may be identified by a how-to query. A how-to query is a search query that identifies a task and that indicates a desire for information that may be utilized in performing the task. How-to queries include one or more task terms that identify a task and optionally include one or more inquiry terms that indicate a desire for instructions related to performing the task. For example, "how do I change a car tire" is an example of a how-to query that includes task terms ("change a car tire") that identify the task of changing a car tire and includes inquiry terms ("how do I") that are indicative of a desire for information that may be utilized in changing a car tire. As another example, "how do I focus a telescope" is an example of a how-to query that includes task terms ("focus a telescope") that identify the task of focusing a telescope and includes inquiry terms ("how do I") that are indicative of a desire for information that may be utilized in focusing a telescope.

A query may be identified as a how-to query by the video segmentation system 130 utilizing one or more techniques such as those disclosed herein. In some implementations a how-to query may be identified as a how-to query based on one or more key terms and/or key phrases that may be included in the query. For example, a query may be identified as a how-to query based on matching a prefix of the query to one or more inquiry terms. The prefix of a query is a sequence of one or more terms occurring at the beginning of a query. Inquiry terms includes phrases such as "how to", "how do I", "how does one", "does anyone know", "where do I find instructions to", "where can I get instructions to", "can someone tell me", "teach me to", and "tell me how" and/or terms such as "how", "where", "instructions" and "?". In some implementations the video segmentation system 130 may identify a query as a how-to query if it includes a prefix with one or more inquiry terms and also includes one or more additional terms following the prefix. In some implementations matching a prefix of the query to one or more inquiry terms may be combined with additional techniques, such as those disclosed herein, in determining if a query is a how-to query.

Also, for example, a query may be identified as a how-to query based on matching one or more terms of the query to one or more inquiry terms and also matching one or more terms of the query to one or more task terms. In some implementations the video segmentation system 130 may identify a query as a how-to query if it includes one or more inquiry terms and also includes one or more task terms. For example, the query "change flat tire?" may be identified as a how-to query based on matching of the terms "change flat tire" to the task phrase "changing a flat tire" and matching of the term "?" to the inquiry term "?". Also, for example, the query "remove tar instructions" may be identified as a how-to query based on matching of the terms "remove tar" to the task phrase "removing tar" and matching of the term "instructions" to the inquiry term "instructions". Exact matching and/or soft matching between terms of a query and inquiry terms and/or task terms may be utilized. In some implementations a list of key terms and/or key phrases (including task terms and/or inquiry terms) that may be frequently included in how-to queries may be stored in a database, such as content database 120. For example, the database may include a list of inquiry terms and a list of task terms that may be utilized in identifying how-to queries. In some implementations a listing of task terms may be identified based part-of-speech tagging, semantic analysis, syntactic analysis, and/or other techniques.

In some implementations the frequency of inquiry terms and/or task terms that are included in a query may be utilized in determining if a query is a how-to query. For example, in some implementations data related to the frequency of key terms and/or key phrases (e.g., frequency in queries and/or frequency across another corpus of documents) may optionally be stored in the content database 120 and utilized in determining if a query is a how-to query. For example, in some implementations a query may only be identified as a how to query if it includes one or more inquiry terms and includes one or more task terms that are associated with at least a threshold frequency. For example, "how do I make a cake from scratch" may only be identified as a how-to query if the task terms "make a cake from scratch" occur with at least a threshold level of frequency in past queries. Thresholding based on frequency of one or more task terms in past queries may enable only queries associated with tasks that are searched for with at least a threshold level of frequency to be identified as how-to queries.

In some implementations the frequency of submission of a query may be utilized in determining if a query is a how-to query. In some implementations data related to the frequency of submission of queries having the key terms and/or key phrases of a query may optionally be stored in the content database 120 and utilized in determining if a query is a how-to query. For example, in some implementations a query may only be identified as a how-to query if it has been submitted with at least a threshold level of frequency. For example, "how do I make a cake from scratch" may only be identified as a how-to query if the query (and optionally variants thereof) constitutes at least threshold level of queries in a record of past queries. Thresholding based on frequency of submission of queries may enable only queries that are submitted with at least a threshold level of frequency to be identified as how-to queries.

In some implementations the video segmentation system 130 may identify a how-to query based on an image. For example, a user may take a photo of a flat tire with client device 110, and the video segmentation system 130 may identify the photo of the flat tire and access a database to associate the photo with a how-to query such as "how do I change a car's tire?" or an identifier of a how-to query associated with changing a car tire. As another example, a user may be wearing glasses equipped with a computing device and an application running on the wearable glasses may detect an image of a hand near a focus knob of a telescope. The video segmentation system 130 may identify the image of the hand near the focus knob of the telescope and access a database to associate the image with a how-to query such as "how do I focus this telescope?" or an identifier of a how-to query associated with focusing a telescope.

In some implementations the video segmentation system 130 may identify and associate similar how-to queries with one another and store the associations in a database such as content database 120. Similar how-to queries may be queries that indicate a desire for information to generally perform similar tasks. For example, "how do I change a tire?", "how to change a flat tire", "how to change a tire step by step", "changing a tire", and "change a flat" may be identified as similar how-to queries because they indicate a desire for information to generally change a car tire. As another example, "how do I focus a telescope?", "how do I view a sharper image of a planet through a telescope", "how to focus your telescope", and "focusing a telescope" may be identified as similar how-to queries because they indicate a desire for information to generally focus a telescope.

Additional and/or alternative methods may be utilized in identifying a how-to query such as methods based on analysis of search results and/or search result documents related to the how-to query. For example, one or more search results responsive to a query may be analyzed to determine if the search result is associated with a search result document that provides a video related to performing a task identified by the query. For example, in some implementations the first X highest ranked search results responsive to a query may be analyzed to determine if at least a threshold number of such search result documents provide videos related to performing a task identified by the query. Also, for example, in some implementations the search result document associated with the search result having the highest selection rate for a query may be analyzed to determine if the search result document associated with the search result provides a video related to performing a task identified by the query.

In some implementations similar queries may be identified by the video segmentation system 130 by utilizing one or more methods including keyword matching, phrase matching, image matching via object detection methods, and/or contextual similarity matching of phrases. Additional and/or alternative methods may be utilized such as methods based on determining similarities between respective search results and/or search result documents related to the how-to queries. In some implementations determination of whether two or more queries are similar may be based exact matching of inquiry terms and/or exact matching of task terms for the respective how-to queries. In some implementations the determination of whether two or more how-to queries are similar may be based on soft matching of the inquiry terms and exact matching of the task terms. In some implementations the determination that two how-to queries are similar may be based on exact matching of the inquiry terms and soft matching of the task terms. In some implementations soft matching between terms and/or phrases may be based on determining an edit distance between the terms and/or phrases and comparing that to a threshold. In some implementations soft matching between terms and/or phrases may be based on comparing canonicalized versions of terms and/or phrases. For example, the inquiry terms could be stemmed and their stop words removed, before matching. Stop words include words that are common and may include articles such as "a", "an," "and," and "the"; prepositions such as "of," "to" and "for"; auxiliary verbs such as "have" and "were"; and/or typical initial words in questions such as "who", "how" and "where". In some implementations soft matching between terms and/or phrases may be based on semantic analysis. For example, a term may be considered to match with one or more synonyms for the term.

Additional and/or alternative matching techniques may be utilized. For example, the similarity between terms may be based on the semantic distance, or length of path along edges between the terms and/or phrases in a lexical database. The lexical database may include key terms and/or phrases including words, nouns, adjectives, verbs, adverbs, etc. and their conceptual and/or semantic inter-relationships. In some implementations the key terms and/or phrases may be grouped based on the meaning of the key terms and/or phrases, and/or their syntactic relationships to other key terms and/or phrases. In some implementations a database such as content database 120 may include distributionally similar inquiry terms and/or task terms and their corresponding distributional similarity scores. Phrases that typically occur in similar contexts may for example be considered to have similar meanings. For example, a first phrase that co-occurs with the same words as that of a second phrase over a collection of documents, such as html web pages, may be considered to be distributionally similar to the second phrase. Identifying two or more queries as similar may be utilized in one or more steps of methods described herein. For example, queries may be grouped together in determining if a collective frequency of query is great enough to constitute identifying such queries as how-to queries and selecting a video to perform a task identified by such queries. Also, for example, identification of sources for determining the video and/or any ranking associated with such sources may be based on a ranking of the sources for each of multiple similar queries. Also, for example, associating a video with a how-to query may include associating the video with a similar how-to query.

Referring to FIG. 2, an example table illustrates the identification of how-to queries. The query "how to remove tar from clothing" has inquiry terms "how to" and task terms "remove tar", "clothing". The inquiry term "how to" identifies the query as a query seeking information related to performing a task. The task terms "remove tar" and "clothing" identify the task. As discussed herein, in some implementations the inquiry terms and/or the task terms may be identified by the video segmentation system 130 based in part on comparing the terms with stored entries in a database, such as content database 120. The stored entries may include, for example, terms that frequently occur in how-to queries. As another example, the query "how can I remove tar from clothing?" has inquiry terms "how can I" and task terms "remove tar" and "clothing". As another example, the query "how do I remove tar from fabric" has inquiry terms "how do I" and task terms "remove tar" and "fabric". As another example, the query "remove tar stains?" has an inquiry term "?" and task terms "remove tar" and "stains". The query "stain buster—tar" does not have inquiry terms. However in some implementations the video segmentation system 130 may identify this query as a how-to query based at least in part on the task terms "stain buster" and "tar".

In some implementations similar how-to queries may be identified among the queries of FIG. 2 based on a matching of terms and/or other techniques. For example, the words "clothing" (queries 1 and 2) and "fabric" (query 3) may be determined to be similar based on their shared semantics. In some implementations the video segmentation system 130 may identify that the words "remove" and "tar" appear in the first four queries. Based at least in part on such identifications, the video segmentation system 130 may identify that the first four how-to queries are similar to one another. Additionally and/or alternatively, the video segmentation system 130 may identify that the words "tar" and "stains" appear in the fourth and fifth queries, and that the words "remove" and "buster" are similar based on their shared semantics. Based at least in part on such determinations, the video segmentation system 130 may identify that the fourth and fifth how-to queries are similar to one another. Accordingly, in some implementations the video segmentation system 130 may identify that all five how-to queries are similar to one another. In some implementations the how-to queries and their identified associations with one another may be stored in content database 120.

In some implementations content database 120 may include a collection of how-to queries issued by users. In some implementations, for each of a plurality of tasks, content database 120 may include data indicative of a number of queries that have been issued that are related to performing the task. In some implementations a how-to query related to performing a task may be identified by the video segmentation system 130 based on a threshold number of queries issued by users that are related to performing the task. For example, the threshold percentage may be identified as 0.2%—that is, at least 0.2% of all issued queries during a specified time interval have to relate to performing a task in order for a query related to the task to be identified as how-to query. For example, the video segmentation system 130 may access content database 120 to identify that queries similar to the query "how to remove tar from clothing" constituted 0.1% of all queries that were issued during the specified time interval. Accordingly, having failed to satisfy the threshold percentage of 0.2%, queries similar to the query "how to remove tar from clothing" may not be identified as how-to queries by the video segmentation system 130. As another example, the video segmentation system 130 may access content database 120 to identify that the queries similar to the query "how do I change a tire" constituted 0.6% of all queries that were issued during the same time interval. Accordingly, having satisfied the threshold percentage of 0.2%, queries similar to the query "how do I change a tire" may be identified as how-to queries by the video segmentation system 130.

In some implementations the threshold percentage may be based on the type of how-to query. For example content database 120 may identify that the query "how do I focus this telescope" constituted 0.005% of all how-to queries issued during the specified time interval. However the threshold for this type of how-to query may be set to a lower value than the threshold for the query "how do I change a tire" based at least in part on a comparison of the average number of users who may use a telescope and the average number of users who may drive a car. For example, the threshold percentage may be 0.004% for a specified time interval. Accordingly, having satisfied the threshold percentage of 0.004%, the query "how do I focus this telescope" may be identified as a how-to query by the video segmentation system 130.

In some implementations the content database 120 may optionally include time stamp data and/or session identification data that facilitate grouping of queries, videos, documents, users, computing devices, and/or other sources of information. In some implementations the content database 120 may only include past queries having submission rates above a certain threshold. In some implementations the content database 120 may only include data that satisfies a time threshold. For example, any queries that are more than a year old may not be stored in the content database 120. Additional restrictions may optionally apply to any stored data such as the exclusion of how-to queries not issued by more than a predetermined number of users. The content database 120 may be collectively stored in one or more computers and/or storage devices.

In this specification, the term "database" will be used broadly to refer to any collection of data. The data of the database does not need to be structured in any particular way, or structured at all, and it can be stored on storage devices in one or more geographic locations. Thus, for example, the content database 120 may include multiple collections of data, each of which may be organized and accessed differently. As another example, the content database 120 may be collectively stored in one or more computers and/or storage devices.

In some implementations users may interact with the search system 140 through one or more client devices 110. The client devices 110 and the search system 140 may each include memory for storage of data and software applications, a processor for accessing data and executing applications, and components that facilitate communication over the communication network 101. The client devices 110 may execute applications, such as web browsers (e.g., web browser 115 executing on client device 110), that allow users to formulate how-to queries and submit them to the search system 140. The search system 140 may receive how-to queries from one or more client devices 110 and may execute the how-to queries against a content database 120 of available documents such as web pages, images, text documents and multimedia content. The search system 140 may identify content which matches the how-to queries, and may respond by generating search results that are provided to the one or more client devices 110 in a form that can be presented to the users. For example, in response to a how-to query from the client device 110, the search system 140 may provide a search results web page to be displayed in the web browser 115 executing on the client device 110.

In some implementations the identification of a how-to query may be based on identifying one or more user-initiated actions. In some implementations the content database 120 may store data that is indicative of a user-initiated action. The user-initiated actions may include, for example, a purchase made by the user, selections made by the user of search results provided by the search engine, resources visited by the user, a download initiated by the user, a search query issued by the user, a post by the user on a social networking platform, a locational query issued by the user, a location check-in by the user, an email communication, and so on. The term "check-in", as used herein, includes a user-approved and/or user-initiated indication of a visit to a location. For example, a user at a Location A may be provided, via a mobile computing device, with an option to verify that the user is at Location A. For example, the option to verify may be in the form of a prompt provided to the user, such as, for example, "Would you like to check-in to your current location?" along with a list of selectable options including "Location A", "Location B", and "Location C". The user may select "Location A" in response to the prompt to check-in to Location A. Also, for example, a user may choose to automatically check-in to one or more locations visited by the user. For example, locational data may indicate that the user is at Location A, and the user, via a mobile computing device, may automatically check-in to Location A. Additional and/or alternative techniques to check-in to a geographical location may be utilized.

In some implementations any user-initiated actions identified from a mobile phone and/or other client devices 110 may not be identifiable to a specific user. For example, in situations in which the systems discussed herein collect personal information about users, or may make use of personal information, the users may be provided with an opportunity to control whether programs or features collect user information (e.g., information about a user's social network, email communications, browsing history, social actions or activities, a user's preferences, or a user's current geographic location), or to control whether and/or how to receive content from the content server that may be more relevant to the user.

For example, the identification of a how-to query may be based on identifying a user's purchase of a replacement part for a vehicle. The video segmentation system 130 may identify the task of installing the replacement part into the vehicle, and the purchase may be identified as an indication of a desire for information on how to install the replacement part into the vehicle. Based at least in part on the user's purchase, the video segmentation system 130 may identify the how-to query as "how do I install the replacement part into the vehicle". The video segmentation system 130 may optionally recommend the query to the user and/or identify video segments responsive to the query and provide the video segments to the user.

As another example, the user may download complex software. The video segmentation system 130 may identify the task of installing the software, and the software download may be identified as an indication of a desire for information on how to install the software. The video segmentation system 130 may identify the how-to query as "how do I install the software". The video segmentation system 130 may optionally recommend the query to the user and/or identify video segments responsive to the query and provide the video segments to the user. As another example, the user may issue a search query via client device 110. In some implementations the search system 140 may receive the search query and the video segmentation system 130 may identify the search query as a desire for information on how to perform a task related to the search query. For example, the user may issue a search query for new houses in a city. The task identified by the search query may be that of looking for a new house in the city, and the search query may be identified as an indication of a desire for information on how to find a new house in the city.

Another example may be that of a user posting a comment on a social networking platform that indicates a desire for information on how to perform a task. For example, the user may post a comment stating: "Stuck in the middle of nowhere with a flat tire". The video segmentation system 130 may identify the task of replacing the flat tire, and the post may be identified as an indication of a desire for information on how to replace the flat tire. Accordingly, the video segmentation system 130 may identify the how-to query as "how do I change a flat tire". The video segmentation system 130 may optionally recommend the query to the user and/or identify video segments responsive to the query and provide the video segments to the user.

In some implementations a map-based query such as a locational query issued by the user may be identified as an indication of a desire for information on how to perform a task. For example, the user may issue a locational query for directions to a busy airport. The video segmentation system 130 may identify the task of finding parking at the airport, and the locational query may be identified as an indication of a desire for information on how to park at the airport. The video segmentation system 130 may optionally recommend a how-to query to the user that would return a set of steps on how to park and/or identify video segments and provide the video segments to the user. Locational queries may be directional locational queries that may be issued by a user to one or more mapping services. For example, a user may issue a directional locational query to a geographic location on a client device 110 and one or more mapping services may be utilized to return a map with directions to the geographic location. As another example, a user may issue a directional locational query to a device equipped with GPS for turn-by-turn directions to a geographic location.

One or more of such user-initiated actions may be combined to identify a how-to query. For example, electronic communications may indicate that the user may be relocating to another city, and the user's browsing history may indicate that the user is searching for elementary schools in the new city. Based at least in part on such combined user-initiated actions, the video segmentation system 130 may identify the task of finding an elementary school, and the user-initiated actions may be identified as an indication of a desire for information on how to find an elementary school in the new city. The video segmentation system 130 may optionally recommend a how-to query to the user that would return video segments on finding an elementary school and/or identify video segments and provide the video segments to the user.

One or more how-to videos may be identified. In some implementations the one or more how-to videos may be identified in response to a how-to query. In some implementations the one or more how-to videos may be identified based on a task identified by one or more user-initiated actions. In some implementations the video segmentation system 130 may identify how-to videos based on an existing classification. For example, a database such as content database 120 may include a collection of videos indexed by topic, genre, date, and so forth. The video segmentation system 130 may identify all videos in such a collection that relate to food recipes. As another example, the video segmentation system 130 may identify all videos in such a collection that include the image of a jackhammer. One or more additional methods may be utilized to identify a how-to video.

In some implementations content database 120 may include a collection of how-to videos responsive to identified how-to queries. For example, the search system 140 may identify video search result documents that are responsive to a how-to query and an identifier for one or more of the video search result documents may then be associated with the how-to query in the content database 120. In some implementations a how-to video may be associated with the how-to query based on a selection rate of the how-to video and/or an amount of time that one or more users spend viewing the how-to video after navigating to the how-to video. For example, how-to videos that have a relatively high selection rate and/or for which users spend a relatively high amount of time viewing may be more likely to be associated with the how-to query.

In some implementations how-to videos may be identified based on a file name. For example, "how_to_change_the_car_tire.mp4" may be identified as a video based on the ".mp4" file extension. It may be identified as a how-to video based on the file name "how_to_change_the_car_tire". One or more additional file extensions may be utilized to identify a video such as, for example, "0.3 g2" for a 3GPP2 multimedia file, ".asf" for advanced systems format file, ".avi" for audio video interleave file, ".flv" for a flash video file, ".mpg" for an MPEG video file, and ".swf" for a shockwave flash movie file.

In some implementations a natural language parser may be utilized to detect key terms and/or key phrases in a video. A database, such as content database 120, may include collections of videos associated with key terms and/or key phrases that appear in the video. In some implementations the video segmentation system 130 may identify key terms and/or key phrases in a how-to query, access the content database 120 to identify one or more associated videos, and identify such videos as how-to videos related to the how-to query.

In some implementations the how-to videos may include a video manual responsive to the how-to query. The video manual may be presented by a professional and may include a set of instructions to assist users in performing one or more tasks. For example, a video manual for a car may include, inter alia, video illustrating how to locate the switch for the hazard lights, where the spare tire and the tools are stored, how to take out the spare tire, how to use the jack, and so forth. Generally, a video manual for a given object may include a title, links to other sources, specific instructions to perform one or more tasks related to the object, may show images of the materials and/or tools needed to perform the one or more tasks, and may provide a video guide to troubleshoot common potential problems. In some implementations the video manual may be accompanied by a text manual. In some implementations the video manual may be accompanied by subtitles.

In some implementations the video segmentation system 130 may further identify one or more video characteristics of a given video. Video characteristics may include one or more of a classification for the given video, access controls, video metadata, an audio transcript, a textual transcript, video text, objects and/or entities appearing in the given video, color characteristics of the given video and sound characteristics of the given video. For example, webpages and/or websites that include videos often require the uploaded videos to be accompanied by a title, a classification, one or more keywords, the author, and so forth. Uploaded videos may also be accompanied by one or more access controls such as whether users may rate the video, whether users may post comments related to the video, whether users may add video responses to the video, and one or more settings for the sharing and/or distribution of the video.

In some implementations the video characteristics of the given video may include an audio and/or textual transcript of the given video. The textual transcript may be based on transcribing the audio based on one or more speech recognition techniques. In some implementations the video segmentation system 130 may identify video text. Video text may include text that appears in the video. For example, the name of a tire company appearing on the image of a tire, the name and/or model of a car appearing in the video, the name and/or model of a telescope appearing in the video, the address on a building appearing in the video, and a web address, may each be identified as video text. Video text may additionally and/or alternatively include text that is displayed on the video (e.g., a timer), text overlaid on the video (e.g., scores and/or game statistics), and/or text from subtitles and/or closed captioning.

In some implementations the video segmentation system 130 may identify color characteristics of the given video. For example, a color histogram may be identified that indicates the distribution of color in the video. A color histogram is a count of how many pixels in a frame correspond to a given color. Color histograms may be utilized in comparing frames in a given video or in comparing two videos. Color motion features may be determined based on the differences between the color histograms of two consecutive frames. In some implementations the video segmentation system 130 may detect additional and/or alternative video characteristics including one or more of edge features (e.g., edge boundary for objects), face features (e.g., number of different faces), and/or audio features (e.g., number of different voices).

In some implementations a confidence measure may be associated with one or more videos. The confidence measure for a given how-to video may be indicative of the effectiveness of the given video in providing correct and comprehensive completion steps for the task of the how-to query. In some implementations the video segmentation system 130 may include scoring system 135 that may determine the confidence measure for a given source. One or more factors may be utilized in determining the confidence measure of the given how-to video. For example, one or more existing rankings and/or one or more user reviews may be utilized in determining the confidence measure of the given how-to video. In some implementations one or more user comments related to the given how-to video may be utilized in determining the confidence measure of the given how-to video. In some implementations one or more rankings from social media platforms may additionally and/or alternatively be utilized in determining the confidence measure of the given how-to video.

In some implementations the confidence measure for the given how-to video may be based on the frequency of visits to a webpage and/or website that includes the given how-to video. Content database 120 may store information that indicates the frequency of visits to the webpage and/or website that includes the given how-to video. A webpage and/or website (including the how-to video) with a higher frequency of visits may be indicative of a webpage and/or website that is popular among users and the how-to video may be associated with a confidence measure more indicative of confidence based on such higher frequency. The confidence measure may, in some implementations, be based on the number of times the given how-to video is viewed. In some implementations the confidence measure may be determined based on how many times the given how-to video is shared. In some implementations the frequency of visits to the webpage and/or website that includes the given how-to video may be visits to the given webpage and/or website after submitting the one or more how-to queries for which the confidence measure of the how-to video is being determined. Data related to the number of times a video is viewed and/or shared may be stored in content database 120.

One or more identified video characteristics may be utilized to determine the confidence measure of the given how-to video. For example, image analysis may be performed on given how-to video. The video segmentation system 130 may identify one or more known entities appearing in the given how-to video. For example, if the given how-to video relates to oil painting and a famous oil painter is identified as a presenter in the given how-to video, a confidence measure more indicative of confidence may be associated with the given how-to video. As another example, if the given how-to video relates to starting a software start-up and a well-known software entrepreneur is identified as one of the presenters in the given how-to video, a confidence measure more indicative of confidence may be associated with the given how-to video. As another example, voice recognition techniques may be utilized to identify voices in the video. If the given how-to video relates to learning how to play the guitar and a well-known singer/guitarist is identified as one of the presenters in the given how-to video based on voice recognition techniques, a confidence measure more indicative of confidence may be associated with the given how-to video. As another example, if the how-to query relates to a technical task, the video segmentation system 130 may determine if the presenter has the appropriate technical qualifications and/or experience to provide authoritative information related to the how-to query and associate a confidence measure based on such determination. Additional video characteristics such as the image and/or sound confidence may be utilized to determine the confidence measure of the given how-to video. One or more of the video characteristics may be combined to determine the confidence measure of the given how-to video.

In some implementations the confidence measure for the given how-to video may be based on the number of documents that link to the given how-to video. In some implementations the confidence measure for the given how-to video may be based on the percentage of documents that link to the given how-to video in a corpus of documents. A larger number and/or percentage of documents linking to the given how-to video may be more indicative of popularity and/or the authoritative value of the given how-to video. Accordingly, the given how-to video may be associated with a confidence measure more indicative of confidence. In some implementations a confidence measure may only be associated with a given how-to video if a threshold number and/or percentage of documents link to the given how-to video.

In some implementations the confidence measure for the given how-to video may be based on the number of outgoing links from the webpage and/or website including the given how-to video. A larger number of outgoing links may be indicative of the comprehensiveness of the given how-to video and the given how-to video may be associated with a confidence measure more indicative of confidence based on such larger number of outgoing links. In some implementations a confidence measure based on the number of outgoing links may optionally be based on one or more additional factors such as a selection rate of the outgoing links. For example, how-to video A may include five outgoing links and two of these five outgoing links may be selected with at least a threshold level of frequency. This may indicate that information from at least two other sources accessed via the outgoing links may need to be combined with the information provided in how-to video A. On the other hand, how-to video B may include the same five outgoing links and none of these five outgoing links may be selected with at least a threshold level of frequency. This may indicate that how-to video B is a more comprehensive source of information than how-to video A since users of source B do not select the outgoing links for additional information with as much frequency as the users of source A. In some implementations how-to video B may be associated with a confidence measure more indicative of confidence and how-to video A may be associated with a confidence measure less indicative of confidence. In some implementations a selection may be identified by collating respective href attributes of outgoing links. As referred to herein, a "selection" of the search result or the resource may include, for example a mouse-click, a click-through, a voice-based selection, a selection by a user's finger on a presence-sensitive input mechanism (e.g., a touch-screen device), and/or any other appropriate selection mechanism.

As another example, the number of outgoing links from the given how-to video may additionally be based on the number of outgoing links that were available (e.g., the number of broken links from the given how-to video divided by the total number of links from the given how-to video). For example, 20% of the outgoing links from how-to video A may be available. The remaining 80% of the outgoing links from how-to video A may be broken. This may indicate that the information provided in how-to video A has not been updated. On the other hand, 65% of the outgoing links from how-to video B may be available. The remaining 35% of the outgoing links from how-to video B may be broken. This may indicate that the information provided in how-to video B is more updated than the information provided in how-to video A. Accordingly, how-to video B may be associated with a confidence measure more indicative of confidence and how-to video A may be associated with a confidence measure less indicative of confidence.

In some implementations the confidence measure for the given how-to video may be based on the timeliness of the given how-to video. For example, a database may include timestamp data indicating the last time the given how-to video was updated and a recently updated how-to video may be associated with a confidence measure more indicative of confidence than a how-to video that has not been recently updated. In some implementations the confidence measure may be based on the length of the passage of time since the last time the how-to video was modified. For example a longer passage of time may be associated with a confidence measure less indicative of confidence than a shorter passage of time. In some implementations a confidence measure based on the passage of time may optionally weight the passage of time based on one or more factors such as a task type associated with the task for which the confidence measure of the how-to video is being determined. How-to videos providing information related to a how-to query for a state-of-the art task may need to be updated more frequently than how-to videos providing information related to another task. For example, for a state-of-the-art task, sources providing information related to the state-of-the art task may need to be updated more frequently than sources providing information related to other task types. Accordingly, the weighting for the passage of time in determining a confidence measure for the source for the state-of the art task may be greater than the weighting for other task types. For example, sources providing information for the initial set-up of a smartphone may need to be updated frequently based on newly released versions of the smartphone. In such an instance, a longer passage of time since the last update may be correlated to a confidence measure less indicative of confidence. On the other sources providing information to change a car's tire may not need to be updated as frequently and a passage of time since the last update may have minimal effect on the confidence measure associated with the how-to video. However, if the tire change task relates to a newly released model of the car, a longer passage of time since the last update and/or a lack of a recent update may be correlated to a confidence measure less indicative of confidence.

In some implementations the confidence measure for the given how-to video may be based on an analysis of the cohesiveness of the given how-to video. Cohesiveness may be determined based on one or more techniques. For example, elements in the given how-to video and/or a transcript of the video may be classified based on their mutual similarities and dissimilarities and a distance measure may be determined between the one or more competing classifications. A small distance between the classifications may be more indicative of the how-to video's cohesiveness, and the given how-to video may accordingly be associated with a confidence measure more indicative of confidence. A large distance between the classifications may be indicative of the given how-to video's lack of cohesiveness, and the given how-to video may accordingly be associated with a confidence measure less indicative of confidence.

In some implementations the confidence measure for a given how-to video may be based on how closely the given how-to video relates to the how-to query. In some implementations such a determination may be based on anchor-text evidence. For example, links between web documents may be marked with textual snippets encoded within anchor tags. The anchor tag on a first document may link to a second document. For example, the format of an HTML link that links to a source providing instructions on how to change a tire may be <a href="https://how-to//change-a-tire.com/~how-to-change-a-tire.mp4"> Link Text</a> and an anchor-text may be associated with this link. For example, the anchor-text may state "View a short video on how to change your car's tires". In such an instance, the format of the HTML link may be, for example, <a href="https://how-to//change-a-tire.com/~how-to-change-a-tire.mp4"> View a short video on how to change your car's tires.</a>. The similarities between the textual snippet in an anchor-text for a given source and the task identified by the how-to query may be utilized as a measure of confidence of the given how-to video for the how-to query. For example, the textual snippet "View a short video on how to change your car's tires" may be determined to have a high degree of similarity with the how-to query "how can one change the car's tire?". In some implementations the textual snippets from all the documents linking to the given source may be analyzed in determining a confidence measure of the given source for a how-to query. A higher degree of similarity between the textual snippet in an anchor-text for a given how-to video and the how-to query may result in a confidence measure more indicative of confidence than a lesser degree of similarity would.

In some implementations the confidence measure of the given how-to video may be based on an analysis of the information-to-noise ratio of the given how-to video. For example, the scoring system 135 may determine how many of the frames in the given how-to video included noise (e.g., commercials and/or other portions of the video not related to the task) as compared to useful content. A higher information-to-noise ratio may be associated with a confidence measure more indicative of confidence whereas a lower information-to-noise ratio may be associated with a confidence measure less indicative of confidence.

One or more techniques discussed herein to determine the confidence measure of a given how-to video may be optionally combined. For example, a linear combination of the one or more confidence measures discussed herein may be utilized to associate a confidence measure with the given how-to video. In some implementations a weighted average of the one or more confidence measures discussed herein may be utilized to associate a confidence measure with the given how-to video. Additional and/or alternative techniques may be utilized to determine the confidence measure of a given how-to video. In some implementations a given how-to video may be associated with a confidence measure and this information may be stored in a database such as content database 120. In some implementations the confidence measure may be utilized to determine a ranking of the identified how-to videos related to a how-to query.

In some implementations the video segmentation system 130 may determine a plurality of video segments of a given video. In some implementations an audio and/or textual transcript of the given video may be utilized to determine the video segments. In some implementations video text may be utilized. For example topic change markers may be identified in closed caption annotators and utilized to determine video segments. Transitional terms such as "first", "next", "followed by", "after", "at the outset", "finally", "step", "moving on", "next part", "other step", "previous step", "in conclusion", etc. may be optionally utilized as topic change markers.

In some implementations determining the plurality of video segments of the how-to video may include identifying transitional indicators of the selected how-to video, each transitional indicator indicative of a transition from one of the video segments to another of the video segments. Transitional indicators of the given video may include transitional terms. In some implementations shot transitions in the given video may be utilized to determine one or more transitional indicators. For example, hard cuts, fades, and dissolves may be identified as transitional indicators. In some implementations one or more additional and/or alternative video characteristics may be utilized to determine the video segments. For example, the color histogram may be utilized to compare successive frames and arrange the frames into groups and one or more video segments may be derived from each such group. Similar frames may generally share similar color characteristics. For example, in a how-to video for changing a car's tire, the frames that capture a wrench being utilized to unscrew the wheel will generally share similar color characteristics. On the other hand, such frames will generally differ in color characteristics from frames that capture the car being lifted with a jack.

Additional and/or alternative video characteristics may be utilized to determine the video segments. For example, motion characteristics of the given video, such as identifying motion vectors and determining motion flow based on a gradient flow may be utilized to identify video segments. For example, in a how-to video for focusing a telescope, the frames that capture the focus knob of a telescope being turned in one direction will generally share similar motion characteristics. On the other hand, such frames will generally differ in motion characteristics from frames that capture the focus knob of a telescope being turned in an opposite direction. The gradient flow may be analyzed and quantitatively grouped to identify transitional indicators and/or video segments. For example, critical values of the gradient flow may correspond to transitional indicators and the gradient flow between two critical values may represent a video segment. Object segmentation techniques, image analysis techniques, scene changes, and/or change characteristics of speech and/or music may be additionally and/or alternatively utilized to identify the video segments.

In some implementations the video segmentation system 130 may modify the given video in one or more ways based on the determined video segments. In some implementations each of the video segments may be an identifier of a certain portion of the given video and the video segmentation system 130 may flag the given video based on the video segments to enable navigation between the video segments within the given video. For example the given video may be modified by annotating it with markers that delineate the video segments. In some implementations the given video may be modified by overlaying it with text and/or subtitles based on the video segments. In some implementations each of the video segments may be an additional video based on the given video, and each of the additional videos may include one or more portions the given video. For example, the given video may be modified by separating the individual video segments into separate stand-alone videos. In some implementations the given video may be modified by associating it with one or more documents, images, videos, text, and so forth. For example, a title may be added to the given video. As another example, a list of tools needed may be extracted from one or more additional sources and such a list may be added to the video. In some implementations one or more determined video segments may not be included among the video segments that may be provided to the user. The given video may be additionally and/or alternatively modified based on one or more techniques discussed herein. For example, one or more of the video segments may be enhanced for improved image and/or sound quality. Stop lists and stemming may be optionally utilized to remove words and phrases that may be determined to be unlikely to have any distinguishing features. Identified noise may be removed from the given video to identify useful content. For example, commercial content and/or other content unrelated to the task may be removed from the given video.

Task attributes for the task may include one or more of a title, introduction, skill level to perform the task, average time required to perform the task and/or perform a portion of the task, tools and/or materials needed, a set of steps to perform the task, and one or more sources of information for the task attributes. In some implementations task attributes may be identified from a textual transcript of the given video. For example, the video segmentation system 130 may identify a video manual and extract the one or more steps from the textual transcript of the video manual. In some implementations the video segmentation system 130 may utilize the confidence measure to rank the one or more videos and select the video with the highest confidence measure as a source for the task attributes related to performing the task. In some implementations the video segmentation system 130 may access content database 120 to identify task attributes related to performing the task.

In some implementations the video segmentation system 130 may identify one or more task attributes for the task based on a plurality of videos. In some implementations the video segmentation system 130 may identify a plurality of sources (not necessarily video sources) and extract one or more task attributes from such sources. In some implementations the plurality of sources may be associated with confidence measures based on one or more task attributes. For example, sources A and B may be associated with a confidence measure more indicative of confidence based on the confidence of information these sources provide related to the tools needed to perform the task. Sources C and D may be associated with a confidence measure more indicative of confidence based on the confidence of information these sources provide related to the materials needed to perform the task. Accordingly, the video segmentation system 130 may identify the tools needed from source A and the materials needed from source C.

As another example, the video segmentation system 130 may identify sources A, B, C, and D. In some implementations these sources may be ranked based on one or more criteria, including criteria similar to that utilized to determine the confidence measure. The video segmentation system 130 may identify one or more task attributes including sets of steps from sources A and B. If sources A and B are how-to-videos, then the sets of steps may be identified from the textual transcripts of the how-to videos. For example, source A may be identified to include steps {A1, A2, . . . , A5} and source B may be identified to include steps {B1, B2, . . . , B6}. The video segmentation system 130 may select steps A1, A2 from source A, followed by steps B2, B4, and B6 from source B, and steps A5 and A8 from source A. Accordingly, the determined set of steps may be {A1, A2, B2, B4, B6, A5, A8}. In some implementations the video segmentation system 130 may not select sources C and D based on a ranking less indicative of confidence. In some implementations, sources C and D may be identified as unreliable sources based on a ranking that fails to satisfy a threshold value.

In some implementations one or more text segments in the textual transcript of a given how-to video may need to be parsed to identify the task attributes. For example, a text segment may be fragmented into sentences and/or parts thereof. In some implementations a given sentence may be parsed into more than one step. In some implementations two or more sentences may be merged together to form a step. One or more natural language processing techniques may be optionally utilized to fragment a text segment into steps that perform at least a portion of the task and/or to identify other task attributes. For example, keywords and/or key phrases may be identified along with their parts of speech. A parse tree may be determined that links keywords and/or phrases in one or more sentences based on their syntactic and/or semantic relationships. In some implementations a context-free grammar may be utilized to structure a sentence from the parse tree. Transitional terms such as "first", "next", "followed by", "after", "at the outset", "finally", etc. may be optionally utilized to segment a paragraph and/or a sentence.

Referring to FIG. 3, an example illustrates the identification of one or more steps to perform a task from a plurality of sources. For example, an identified source A may include three steps {A1, A2, A3}, an identified source B may include four steps {B1, B2, B3, B4} and an identified source C may include three steps {C1, C2, C3}. Based on one or more techniques the video segmentation system 130 may determine the set of steps as, for example, {B2, A2, B3, C3}.

In some implementations the one or more attributes for the set of steps may be identified in a manner similar to determining the set of steps as discussed herein. Additionally and/or alternatively, image processing techniques may be utilized to analyze one or more of the plurality of sources to identify objects, entities, text embedded in images, etc. to identify one or more attributes. For example, with reference to the task of changing a car's tire, one or more sources may include images of a wrench and a jack, and these may be identified as tools required to perform the task. As another example, one or more sources may identify a wrench and a jack as tools required to perform the task.

In some implementations information related to attributes may be extracted from the one or more sources based on a term frequency of words and/or phrases that appear in the video text, the textual transcripts, and/or from transcripts of the video and/or audio. In some implementations the term frequency determination may be based on term frequency inverse document frequency ("TFIDF") weighting of a word and/or phrase. For example, terms like "telescope" and "focus knob" may be relatively rare in a corpus of documents, but the frequency of the terms "telescope" and "focus knob" appearing in a given document may be higher than their respective frequencies in a corpus of documents. Accordingly, a greater weight may be associated with the terms "telescope" and "focus knob" based on TFIDF. A term with low frequency in a corpus of documents but a very high frequency in a given subset of documents may be associated with a TFIDF weight indicating its relative importance in the given subset of the corpus of documents. Accordingly, "telescope" and "focus knob" may be identified as terms that are highly relevant in the given subset of the corpus of documents.

As another example, the title associated with the task may be identified in one or more ways such as identifying the title from the video text, from the audio, from an instruction manual, from transcripts of the video and/or audio, and so forth. In some implementations the title may be based on the how-to query itself. For example, if the how-to query states "how do I focus a telescope", the video segmentation system 130 may identify the title as "Focusing a telescope". In some implementations one or more inquiry terms of a how-to query (e.g., "how to") may be combined with one or more task term (e.g., "telescope" and "focus knob") to determine a title (e.g., "How to focus a telescope"). In some implementations the title may be based on an anchor text of one or more sources from which the set of steps is determined. For example, the anchor-text associated with a primary source from which the how-to video is selected may state "Learn more about how to focus a telescope", and the video segmentation system 130 may identify the title as "Focusing a telescope".

As another example, an average time needed to perform a task and/or a portion of the task may be identified. For example, the length of the video may be indicative of the average time taken to perform the task. In some implementations the video may be edited to reduce noise (e.g., remove commercials, introductory material, credits, etc.) and the average time required may be determined based on such video with reduced noise.

In some implementations one or more of the plurality of video segments may be related to one or more task attributes for the task. In some implementations determining the plurality of video segments of the how-to video may include determining a first video segment of the video segments based on presence of a first step in the first video segment and determining a second video segment of the video segments based on presence of a second step in the second video segment. For example, if it is determined that six steps are needed to perform a task, then six video segments may be determined, one for each step to perform the task. In some implementations the first step may be associated with the first video segment and the second step may be associated with the second video segment. In some implementations an introductory video segment may be determined that identifies the task and provides a brief overview on how to perform the task. In some implementations one or more of the plurality of video segments may not be related to any aspects for the task. For example, in some implementations a video segment may correspond to a commercial and/or sponsored segment.

A task may, in some implementations, be associated with a template. The template may be indicative of desired contents of the how-to videos. In some implementations the template may be based on the identified one or more sources. In some implementations the identified one or more sources may include one or more how-to videos. In some implementations the video segmentation system 130 may create a template based on the one or more task attributes. In some implementations the confidence measure for a given how-to video may be based on a comparison of the given how-to video to the template. In some implementations the template may be based on the video segments of the how-to video. In some implementations the video segmentation system 130 may determine one or more video segments of a given how-to video based on a template associated with the task. In some implementations the task attributes may be determined from the task template for the task. In some implementations the template may be identified with appropriate markers (e.g., embedded markers, HTML tags, fade-ins, fade-outs) that distinguish different task attributes. For example, the template may list the tools needed and the steps needed to perform the task. As another example, the template may list the tools, materials, average time taken, and the steps needed to perform the task. In some implementations the template may identify the number of tools, the number of steps, the average difficulty of performing each step, and so forth. In some implementations the template may be a determined set of steps responsive to the task.

In some implementations the template may be an outline for a conforming video responsive to the task. For example, the template may be in the form of a relational database with one or more structural elements related to the task. The structural elements may be for "<Task>", "<Query>", "<Title>", "<Tools>", "<Steps>", and so forth. One or more structural elements in the template may be hyperlinked to one or more sources that contribute to the identification of such structural elements. The template may be additionally and/or alternatively associated with tags and/or metadata. The template may be in textual and/or video format. In some implementations the video segmentation system 130 may store the template, and optionally the associated hyperlinks, metadata, and/or tags in one or more databases such as content database 120. In some implementations the template may be associated with the how-to query.

In some implementations the template may be in the form of a web template based on object-oriented programs. For example, classes including instance variables such as "<Task>", "<Query>", "<Title>", "<Tools>", "<Steps>", and so forth may be provided with methods for populating the instance variables. The code may be in one or more formats including HTML, HamI, and Java. In some implementations such code may be generated automatically and/or the instance variables may be identified and populated automatically.

In some implementations the templates associated with similar how-to queries may be reformulated into corresponding canonical representations using canonicalization rules. The canonicalization of the templates enables the mapping of similar how-to queries that represent similar information requests and that share a number of terms having the same or similar form. Canonicalization of the templates may also enable the mapping of dissimilar how-to queries that represent dissimilar information requests, but that share a number of terms having the same or similar form. For example, different how-to videos may share one or more task attributes, and mappings between the respective templates may identify such shared attributes. The canonicalization rules may include stemming of terms in the templates. Stemming is the process of reducing various grammatical forms of a term to a common root form, which may or may not be a valid word. Stemming may include the removal and/or replacement of characters in the term. For example, stemming may include replacing plural nouns with corresponding singular nouns. Thus, 'tires' may be stemmed to 'tire'.

In some implementations, the canonicalization rules may include the removal of terms in the query templates that are stop words. Stop words include words that are common. The stop words may include articles such as "a", "an," "and,"

and "the". The stop words may include prepositions such as "of," "to" and "for". The stop words may include auxiliary verbs such as "have" and "were". The stop words may also include typical initial words in questions such as "who", "how" and "where". In some implementations, the canonicalization rules may include arranging canonical forms of attributes in the templates based on a predefined order. For example, the canonical forms of attributes in the templates may be arranged in alphabetical order. Identical terms in a given template may be removed in some implementations. Other canonicalization rules may also be used.

In some implementations the canonical representations of the templates may be compared to identify one or more other similar how-to queries that have template canonical representations matching that of a given how-to query. The number of similar how-to queries that have the same template canonical representation may vary from implementation to implementation. As described in detail herein, a template may be utilized in segmenting a how-to video, and/or in determining the confidence measure of a how-to video based on matching of the how-to video to the template. In some implementations, the matching may be carried out by exact matching of one or more terms in the canonical representation. In other implementations, the matching may be carried by soft matching of the one or more terms in the canonical representation. The soft matching may for example be carried out by calculating an edit distance of the one or more terms in the canonical representation and comparing that to a threshold.

In some implementations the template may be indicative of desired progression of the how to videos and the comparing the given video to the template may include determining a given progression of the given video and determining similarity between the given progression and the desired progression. For example, the template may be based on determining an appropriate sequence of performing the steps. In some implementations the template may be based on presenting a title and/or a short introductory overview of the task.

Referring to FIG. 4, an example illustrating a template for a how-to video is shown. Template 400 may, in some implementations, be a relational database with one or more structural elements. Template 400 may include structural elements such as "<Task>" 405, "<Query>" 410, "<Title and/or Introduction>" 415, "<Skill Level>" 420, "<Average Time>" 425, "<Tools>" 430, "<Materials>" 435, "<Steps>" 440, and "<Sources>" 445. In some implementations each structural element may include a hierarchal list of structural elements. In some implementations "<Query>" 410 may be linked to other similar how-to queries (in a database such as content database 120) that may relate to the same task, as disclosed herein. In some implementations "<Tools>" 430 may be additionally and/or alternatively associated with a structural element "<Number of Tools>" 430a that indicates a desired number of tools required to perform the task. In some implementations the template 400 may include a list of tools under "<Tools>" 430 and the number of tools under "<Number of Tools>" 430a. Likewise, in some implementations "<Materials>" 435 may be additionally and/or alternatively associated with a structural element "<Number of Materials>" 435a that indicates a desired number of materials required to perform the task. In some implementations the template 400 may include a list of materials under "<Materials>" 435 and the number of tools may be listed under "<Number of Materials>" 435a. In some implementations template 400 may include the steps needed to perform the task. The steps may be listed in "<Steps>" 440 and the number of steps may be optionally listed in "<Number of Steps>" 440a.

Referring to FIG. 5, an example display of determined video segments and task attributes for a how-to video is illustrated. The display may be determined based on an identified template associated with the how-to query "how do I change a car's tire?". In some implementations the display may be determined by populating the entries in the respective structural elements in a template as, for example, described with reference to FIG. 4. The first column may identify the task. The second column may list one or more task attributes. For example, a set of steps corresponding to the how-to query may be determined. In the figure, steps are labeled with roman numerals I through X. The description of each step may appear in the column next to the step number. For example, the column adjacent to "step III" includes the description "Position the jack under a flat portion of the chassis close to the flat tire." In some implementations the display may include video segments that relate to one or more attributes. In the example illustrated here, a video segment for each step appears in the column to the right of each step. For example, the column adjacent to the description for "step III" may contain a selectable link to a video segment. The entries in the example display may be organized and/or linked in one or more alternative formats depending on, for example, the structure of the database where the example display may be stored.

In some implementations one or more task attributes may be identified from additional sources and associated with a given video. For example, the plurality of video segments may be determined based on the given video. Additionally, one or more of the task attributes may be identified from one or more additional sources. For example, the set of steps may be identified based on the given video. Step I to step X may be determined based on the given video. Each of a plurality of video segments may be associated with each of steps I through X, each video segment relating to the performance of the respective step in the set of steps. Additionally and/or alternatively, the title, average time required, tools needed, materials needed, and/or sources may be determined from one or more additional sources. In some implementations information related to the task may be identified from one or more videos, and/or one or more additional sources.

One of the how-to videos may be selected. In some implementations the selection may be based on the confidence measure. In some implementations the how-to videos may be ranked based on the confidence measure and the top ranked how-to video may be selected. A plurality of video segments of the how-to video may be determined as discussed herein. In some implementations plurality of video segments of the how-to video may be determined only for the selected how-to video. In some implementations a threshold may be identified based on the confidence measure and video segments determined for the one or more how-to videos (of the plurality of how-to videos) that are associated with confidence measures that satisfy the threshold. In some implementations video segments may be determined for each how-to video in the plurality of how-to videos. In some implementations a collection of videos related to an identified task may be identified. The scoring system 135 may determine a confidence measure for each video in the identified collection. For example, the confidence measure may be a measure of popularity for a given video based on the number of views. The video segmentation system 130 may determine a threshold based on the task and identify videos in the identified collection that may be associated with a confidence measure that satisfies such threshold. The video segmentation system 130 may determine a plurality of video segments for such identified videos.

Figure 6:
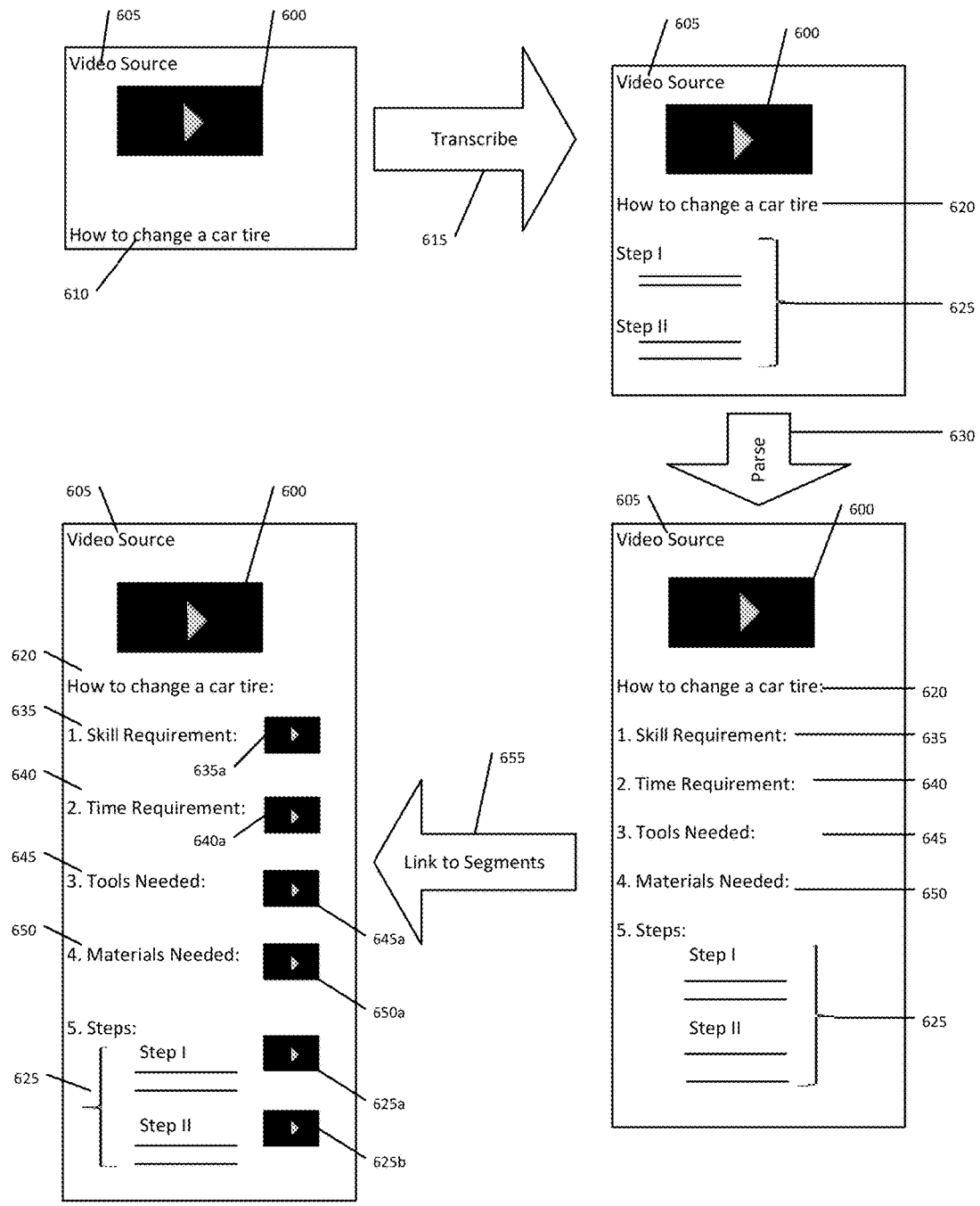
FIG. 6 is an example illustrating the determination of a plurality of video segments of a selected how-to video.

Referring to FIG. 6, an example illustrating the segmentation of a selected how-to video into one or more video segments is shown. A how-to video 500 associated with a how-to query 510 ("How to change a car tire") may be identified from a source 505. In some implementations the how-to video 500 may be transcribed at step 515 to determine a textual transcript. The textual transcript may be utilized to identify a title 520 ("How to change a car tire"). In some implementations the title 520 may be based on the how-to query 510. A set of steps 525 may be determined based on the textual transcript of the how-to video 500. The textual transcript may be additionally parsed at step 530 to obtain one or more additional task attributes. For example, a skill requirement 535, time requirement 540, tools needed 545, and materials needed 550 may be identified as task attributes. Based at least in part on the task attributes, a plurality of video segments of the how-to video may be determined at step 555. The video segments may be associated with the corresponding task attributes. For example, video segment 535*a* may be associated with skill requirement 535, video segment 540*a* may be associated with time requirement 540, video segment 545*a* may be associated with tools needed 545, video segment 550*a* may be associated with materials needed 550, video segment 525*a* may be associated with step I of the set of steps 525, and video segment 525*b* may be associated with step II of the set of steps 525.

In some implementations the confidence measure of a how-to video may be based on the one or more task attributes. For example, a larger number of steps may be more indicative of the comprehensiveness of the how-to video. Accordingly, a given how-to video providing a large number of steps to perform a task may be associated with a confidence measure more indicative of confidence. As another example, a how-to video that provides more task attributes may be associated with a confidence measure more indicative of confidence. For example, a how-to video that provides the tools required, the materials required, and a set of steps may be associated with a confidence measure more indicative of confidence than a how-to video that provides only the tools required and a set of steps.

In some implementations the confidence measure for the how-to video may be based on the video segments of the how-to video. In some implementations the video segments of a given how-to video associated with a how-to query may be compared to an existing template associated with the how-to query and/or the task. One or more measures of similarity may be utilized to compare the how-to query to the template. A higher similarity measure between the how-to video and the template may be associated with a confidence measure more indicative of confidence of the how-to video.

In some implementations the confidence measure for the how-to video may be based on a template for the task. The how-to video may be compared to the template to determine the confidence measure for the how-to video, the confidence measure being indicative of correlation between the video segments of the how-to video and the template. One or more measures of similarity may be utilized to compare the how-to video to the template. A higher similarity measure between the how-to video and the template may be associated with a confidence measure more indicative of confidence of the how-to video.

For example, the template may indicate that a task requires six distinct steps. The given how-to video may be analyzed to determine if the six distinct steps are present in the video. In some implementations one or more video segments of the how-to video may be utilized to make such a determination. A confidence measure more indicative of confidence may be associated with the given how-to video if all six distinct steps are identified in the how-to video than if fewer than six steps are identified. As another example, the template may indicate that the task may be associated with seven identified tools and three identified materials. A confidence measure more indicative of confidence may be associated with the given how-to video if seven identified tools and three identified materials are identified in the how-to video than if fewer than seven identified tools and/or three identified materials are identified.

In some implementations where the template is based on a video, the similarity measure may be based on a comparison of one or more video characteristics of the how-to video and the template. For example, the similarity measure may be based on a comparison of the respective color histograms, color motion features, motion characteristics, and/or sound characteristics of the video. In some implementations the similarity measure may be based on a comparison of the respective video segments of the how-to video and the template. In some implementations the similarity measure may be based on the likelihood of co-occurrence of the how-to video and the video of the template over a collection of documents. In some implementations such documents may be internet-based documents such as HTML documents and/or PDF documents that may include links to the how-to video and the template. In some implementations the collection of documents may be stored in a database such as, for example, the content database 120.

In some implementations the similarity measure may be based on an edit distance between the textual transcript of the how-to video and the template. The edit distance may be indicative of the difference between the respective keywords and/or key phrases in the how-to video and the template. In some implementations the edit distance may count the number of characters in which two keywords may differ from each other. For example, the edit distance between "stain" and "stains" may be determined to be one, whereas the edit distance between "stain" and "stained" may be determined to be two. In some implementations the edit distance between a word and its augmentations may be set to be zero. For example, "stain", "stains", "stained", "staining", etc. may be determined to share "stain" as a common root and any pair of words formed from these four words may be determined to have an edit distance of zero.

In some implementations the similarity measure may be based on the contextual usage of the respective keywords, key phrases, images, and/or sounds in the how-to video and the template, including, for example, measures based on identifying a semantic similarity score, a context-based matching score, and/or statistical term frequencies. Additional and/or alternative techniques may be used to determine the similarity measure.

In some implementations the confidence measure for the how-to video may be based on a relevance score for each of one or more identified task attributes of the how-to video. In some implementations the relevance score for a task attribute may be indicative of confidence that the task attribute is an appropriate task attribute for completing the task. In some implementations the relevance score for a task attribute may be based on a confidence rating such as "high confidence", "medium confidence", and "low confidence".

For example, if an overwhelming majority of sources indicate that a given step in a set of steps is required to perform the task, then the given step may be associated with a confidence rating of "high confidence" indicating a high level of confidence that the given step is required to perform the task. On the other hand, if only 70% of the sources indicate the given step is required, then the given step may be associated with a confidence rating of "medium confidence". As another example, if only 50% of the sources indicate the given step is required, then the given step may be associated with a confidence rating of "low confidence". Accordingly, a how-to video including only steps that are associated with "high confidence" may have a confidence measure more indicative of confidence than a how-to video that includes one or more steps associated with "low confidence".

In some implementations relevance scores may be associated with one or more identified task attributes other than steps. The confidence measure of the how-to video may likewise be based on the relevance scores for the one or more task attributes. For example, if 90% of the sources mention a jack and a wrench in a listing of tools, then a relevance score indicative of high relevance, and/or a confidence rating of "high confidence" may be associated with a jack and wrench. On the other hand, if 50% of the sources indicate a flashlight in a listing of tools, then a relevance score not indicative of high relevance, and/or a confidence rating of "medium confidence" may be associated with a flashlight. Accordingly, a how-to video including only tools that are associated with "high confidence" may have a confidence measure more indicative of confidence than a how-to video that includes one or more tools associated with "medium confidence". In some implementations a flashlight may be included as an optional tool based on its lower relevance score. In some implementations the jack, the wrench, and the flashlight may optionally be individually associated with relevance scores ranked relative to one another. In some implementations a relevance score for a set of tools may be determined. The relevance score for the set of tools may be based on the individual relevance scores for the tools in the set, such as the individual relevance scores for the jack, the wrench, and the flashlight. Thresholding may optionally be utilized in determining one or more attributes (e.g., to filter out outlier data).

In some implementations the confidence measure for the selected how-to video may be based on a number of sources that agree on the task attributes for performing the task. For example, the scoring system 135 may determine a confidence measure less indicative of confidence for a how-to video if multiple sources indicate that one or more of the determined set of steps of the how-to video are optional. Also, for example, the scoring system 135 may determine a confidence measure less indicative of confidence for a selected how-to video if certain steps were omitted from the determined set of steps because less than a threshold level of sources failed to indicate those steps as necessary, but multiple sources still indicated that one or more of the determined set of steps were desired. Also, for example, the scoring system 135 may determine a confidence measure less indicative of confidence for a selected how-to video if the collection of identified sources identify multiple ways to perform the task. In some implementations the scoring system 135 may determine a confidence measure less indicative of confidence if there are multiple ways to perform the task.

In some implementations the confidence measure of the how-to video may be based on the relevance scores for the determined video segments. The relevance scores for the video segments of the how-to video may be determined in a manner similar to the determination of relevance scores for the one or more task attributes. For example, if the video segment relates to a single task attribute, the confidence measure for the video segment may be based on the relevance score of the single task attribute.

Additional and/or alternative techniques may be utilized to determine a confidence measure. In some implementations a linear combination and/or a weighted average of the relevance scores for the individual task attributes and/or video segments included in the how-to video may be utilized to determine the confidence measure for the how-to video. In some implementations any determined confidence measures may be stored in a database such as content database 120.

In some implementations a threshold for the confidence measure may be determined and only a selected how-to video that is associated with a confidence measure satisfying that threshold for the confidence measure may be indicated as authoritative when provided. In some implementations a how-to video associated with a relevance score lower than the threshold for the confidence measure may be indicated as less authoritative when provided. In some implementations if the confidence measure associated with a how-to video does not satisfy the threshold for the confidence measure, then the video segmentation system 130 may re-determine the video segments of the existing how-to video, identify additional task attributes, and/or identify a new how-to video to be analyzed.

In some implementations the identified how-to query may be associated with one or more of the selected how-to video, the video segments, the template, and the task attributes, and such associations may be stored in content database 120. In some implementations such aspects may be stored in a database such as content database 120 to be provided in response to a how-to query. In some implementations the selected how-to video may be provided in response to a how-to query. For example, users may issue a how-to query with the search system 140 through one or more client devices 110. The search system 140 may receive how-to queries from one or more client devices 110 and may execute the how-to queries against a content database 120 of associated videos, templates, and/or task attributes. The search system 140 may identify the selected how-to video associated with the issued how-to query, and may respond by providing the selected how-to video and indicators of the video segments and/or task attributes to the one or more client devices 110 in a form that can be presented to the users. As indicated herein, in some implementations how-to queries may be formulated by a user via textual input. In some implementations how-to queries may additionally and/or alternatively be formulated based on spoken commands and/or image and/or video analysis. For example, a client device 110 of a user may receive speech input from a user and submit a query to search system 140 based on such speech input. Also, for example, a client device 110 of a user may capture image and/or video and submit a query to search system 140 based on such image and/or video. For example, a client device 110 of a user may be utilized to capture an image of a flat tire and the image of the tire may be provided to search system 140. Based on such an image, the search system may determine the user is looking for steps related to changing a flat tire.

In some implementations the video segments may be included as part of a search result display provided in response to a how-to query. For example, as illustrated in FIG. 5, video segments may be integrated into the search result display. The user may navigate the how-to video by choosing to view one or more video segments. For example, the user may issue the query "how do I change my car's tire?" and the search system 140 may access content database 120 and provide the associated how-to video to the user. The user may have already parked the car, taken out the tools and the spare tire, and may want to see how to position the jack under the car. The user may select the video segment associated with step III (with reference to FIG. 5) and its description "Position the jack under a flat portion of the chassis close to the flat tire" and directly view that video segment.

Figure 7:
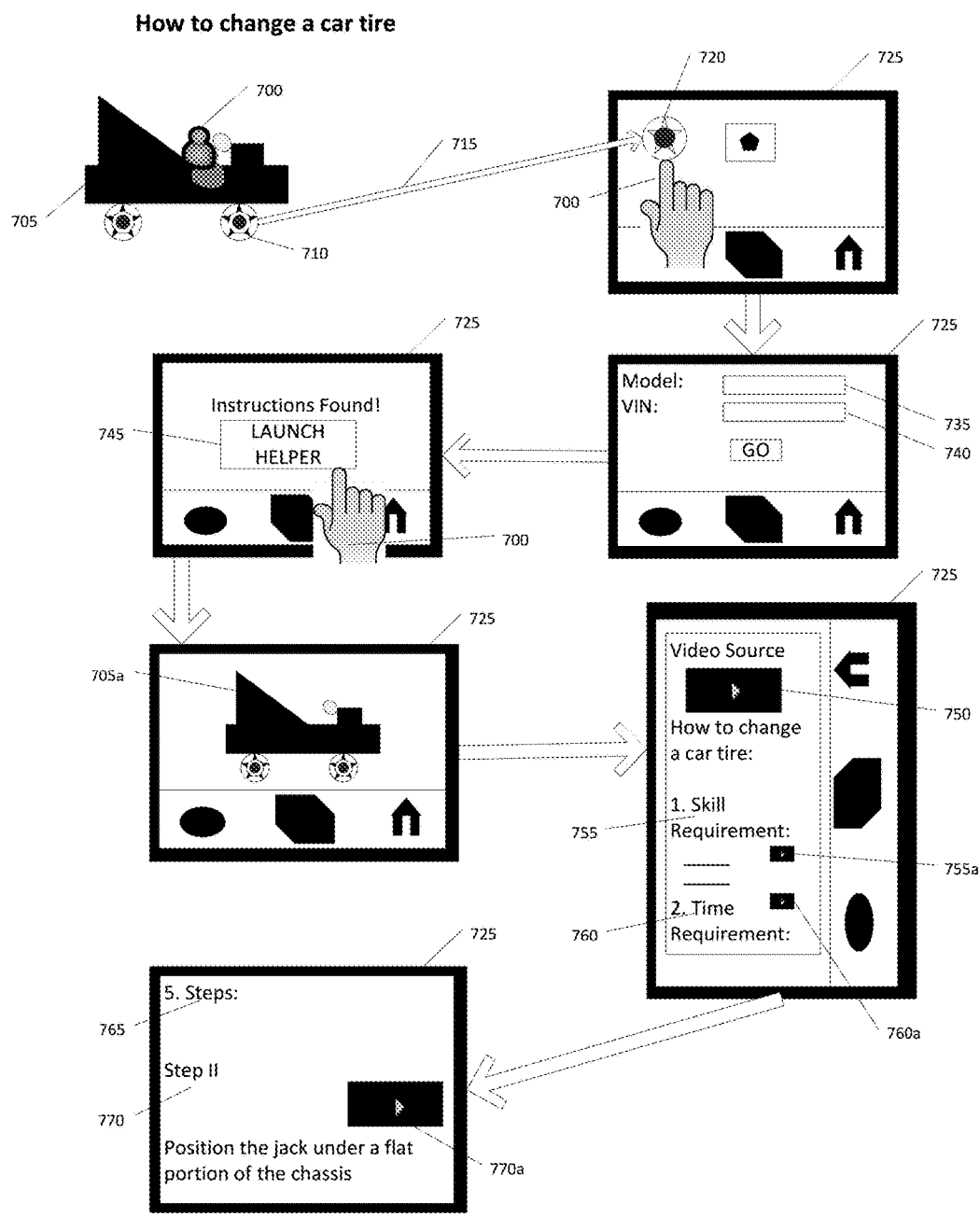
FIG. 7 is an example graphical user interface for providing a plurality of video segments of a selected how-to video.

Referring to FIG. 7, a schematic diagram illustrates an example graphical user interface for providing a plurality of video segments of a selected how-to video. User 600 may be driving a vehicle 605 and may need to replace flat tire 610. The user may use a mobile device 625 to take a photograph of the flat tire 610. The photograph may be uploaded at step 615 and an image 620 of the flat tire 610 may be displayed on mobile device 625. In some implementations the image 620 may be a selectable image and user 600 may select image 620. One or more applications running on mobile device 625 may issue a search query based on the image 620. The search system 140 may provide the query to the video segmentation system 130 which may identify image 620 as a flat tire and accordingly identify the how-to query to be "how to change a tire". The search system 140 may prompt user 600 to enter the model number 635 of the vehicle and the vehicle identification number ("VIN") 640 to further refine the search, and may access content database 120 to identify a responsive how-to video 650. In some implementations the video segmentation system 130 may inform user 600 that instructions may be available and provide user 600 with an application launcher 645 ("Launch Helper"). User 600 may launch the application by selecting application launcher 645. In some implementations the video segmentation system 130 may display an image 605a of a vehicle similar and/or identical to vehicle 605 on mobile device 625. The video segmentation system 130 may provide the how-to video 650 associated with the how-to query. One or more task attributes and/or associated video segments may also be displayed. For example, skill requirement 655 may be displayed with the associated video segment 655a, and time requirement 660 may be displayed with the associated video segment 660a. A set of steps 665 associated with the how-to query may also be provided. User 600 may navigate the selected how-to video and may select the video segment associated with any task attribute. For example, user 600 may select the video segment 670a associated with step II 670 that corresponds to the step "position the jack under a flat portion of the chassis.".

In some implementations the video segmentation system 130 may identify one or more objects in a how-to video based on identifying keywords, key phrases, and/or images that may appear in the video segment. The video segmentation system 130 may associate the objects with the video segments in which they may appear. For example, referring to FIG. 5, step I may be associated with objects "car" and "hazard lights", step III with objects "jack", "chassis", "flat tire", step VIII with a "wrench" and so forth. It may be determined that the object "jack" appears in steps III, IV and IX. Likewise, it may be determined that the object "wrench" appears in steps V and VIII. Such identifications may be stored in content database 120. In some implementations the image of a jack may be identified by the video segmentation system 130. The video segmentation system 130 may identify that the jack appears in the video segments corresponding to steps III, IV and IX. The user may be provided with the video segments associated with steps III, IV and IX. As another example, the image of a wrench may be identified by the video segmentation system 130. The video segmentation system 130 may identify that the wrench appears in the video segments corresponding to steps V and VIII. The user may be provided with the video segments associated with steps V and VIII.

In some implementations the scoring system 135 may determine a quality measure for a selected how-to video. The quality measure is indicative of quality of the selected how-to video provided in response to a how-to query based on user feedback. The quality measure may be used to refine the confidence measure of the selected how-to video. For example, the determined quality measure of a given selected how-to video and/or determined template responsive to a given how-to query may be indicative of negative feedback and utilized to demote the confidence measure associated with the given selected how-to video and/or determined template for the given how-to query. In some implementations the quality measure may demote a confidence measure to a degree wherein the confidence measure does not satisfy a threshold required to continue to provide the given set of steps in response to the given how-to query.

In some implementations the quality measure may be based on a number of users viewing the selected how-to video and/or determined template provided in response to the how-to query, the number of sites linking to the selected how-to video and/or determined template, user reviews, and/or user ratings. One or more techniques may optionally be combined to determine the quality measure. In some implementations a threshold value may be determined and the quality measure of a selected how-to video and/or determined template provided in response to a how-to query may be compared to the threshold value. A selected how-to video and/or determined template associated with a how-to query may be associated with a quality measure indicative of high quality if the quality measure satisfies the threshold. In some implementations the difference between the quality measure and the threshold value may be indicative of the quality of the selected how-to video and/or determined template. For example, a larger positive difference may be more indicative of confidence and/or associated with a rating of "high confidence", a smaller positive difference may be less indicative of confidence and/or associated with a rating of "medium confidence", whereas if the quality measure does not satisfy the threshold, it may be associated with a quality measure indicative of low confidence and/or associated with a rating of "low confidence". If the quality measure does not satisfy the threshold for the quality measure, in some implementations the video segmentation system 130 may perform additional steps to increase the quality measure for the selected how-to video and/or determined template. For example, the video segmentation system 130 may determine a new segmentation of the how-to video and/or determine a new template in response to a how-to query.

Similar techniques may be utilized to determine a quality measure of each task attribute and/or video segment in the selected how-to video and/or determined template provided in response to a how-to query.

In some implementations the selected how-to video may be displayed in a highlighted form. In some implementations the selected how-to video may be displayed with a heading such as "Best Guess" indicating a medium level of confidence in the selected how-to video and/or template. In some implementations the selected how-to video may be displayed with a heading such as "Authoritative Steps" indicating a high level of confidence in the selected how-to video and/or template. Additional and/or alternative indicators of confidence may accompany the selected how-to video and/or template. Indicators of confidence may be based on a confidence measure associated with the selected how-to video as described herein.

In some implementations indicators of confidence may additionally and/or alternatively be associated with individual task attributes and/or video segments. Indicators of confidence for the selected how-to video may be based on relevance scores associated with the task attributes and/or video segments as described herein. For example, each step in the set of steps may be provided with an indicator of confidence in that step. For example, steps A, B, and C may be provided with a "high confidence" rating whereas step D may be provided with a "medium confidence" rating. In some implementations one or more optional steps may be provided. In some implementations one or more optional steps may be provided with confidence measures based on relevance scores associated with the optional steps. For example, an optional step may be annotated with the statement "60% of sources suggest step E as a step". In some implementations optional steps and/or alternate steps may be annotated with confidence measures that are indicative of user feedback directed particularly at such steps. For example, steps E and F may be provided as optional steps and/or alternate steps and may be annotated with the statement "60% of users recommended step E whereas 20% of users recommended step F". In some implementations the one or more video segments may be provided with an indicator of confidence as described herein.

In some implementations if the selected how-to video is associated with a quality measure and/or relevance score indicating "low confidence", the video segmentation system 130 may respond to the user's query with an indication that the selected how-to video is associated with a rating of "low confidence." In some implementations the selected how-to video may be displayed with a heading such as "Low confidence guess". In some implementations the user may be prompted prior to providing the selected how-to video to determine if the user is interested in the selected how-to video associated with a relevance score that is indicative of lower quality. The video segmentation system 130 may determine whether to provide the selected how-to video based on whether the user indicates an interest in the lower quality of selected how-to video and/or template. In some implementations the video segmentation system 130 may store user responses to one or more such prompts and determine the quality measure of the selected how-to video based on user responses. For example, if more than a threshold number of users indicate a desire to receive the selected how-to video associated with a relevance score indicating "low confidence", the video segmentation system 130 may determine a quality measure indicative of quality and increase the relevance score for that selected how-to video based on the quality measure. In some implementations the video segmentation system 130 may respond to a how-to query by stating that "The selected how-to video is associated with a rating of 'low confidence'; however, 75% of users are willing to receive the set of steps", and then prompt the user for an indication as to their desire to receive the selected how-to video.

In some implementations a query score may be associated with a query and/or a sequence of queries submitted by a user. The query score is indicative of confidence that a submitted query and/or sequence of queries indicate a desire to receive a selected how-to video for completing a task indicated by the query. For example, a query that includes an inquiry term and a task term has a high likelihood of being a query for which it is desirable to provide a selected how-to video for completing a task related to the task term. Accordingly, a query score more indicative of confidence that the submitted query is a query for which it is desirable to provide a selected how-to video for completing a task related to the task term of the query may be associated with such a query. As another example, a query that includes an inquiry term and does not include a task term that identifies a specific task has a high likelihood of being a how-to query, but cannot be tied to a specific task. For example, the task term may be ambiguous and related to multiple tasks. Accordingly, a query score less indicative of confidence that the submitted query is a query for which it is desirable to provide a selected how-to video for completing a task related to the task term may be associated with such a query. As another example, for a query that includes an inquiry term and does not include any task term, a query score may be determined that indicates it is not desirable to provide a selected how-to video for completing a task. As another example, for a query that includes a task term but does not include an inquiry term a query score may be determined that indicates it is not desirable to provide a selected how-to video for completing a task. However, if the query was preceded by one or more queries that included the same task term, or related task terms, then a query score may be determined that indicates it is desirable to provide a selected how-to video for completing a task. Preceding queries that include the same task term or related task terms may indicate the user is likely searching for steps related to completing the task.

In some implementations the query score may be based on the one or more user-initiated actions. For example, the user may download software X with a self-installation feature. Such user-initiated action may have a low likelihood of being an indication of a desire to receive a set of steps for installing the software X. Accordingly, a query score less indicative of confidence may be associated with the query "how to install software X". On the other hand, the user may download complex software Y that may need to be installed manually. Such user-initiated action may have a high likelihood of being an indication of a desire to receive a set of steps for installing the software Y. Accordingly, a query score more indicative of confidence may be associated with the query "how do I install software Y".

In some implementations a query score more indicative of confidence may be associated with a query when the query is based on more than one user-initiated action. For example, electronic communications may indicate that the user may be relocating to a new city. The user's browsing history may indicate that the user is searching for a new school in the city. Based at least in part on such user-initiated actions, the video segmentation system 130 may identify a how-to query as "how do I find a new school in the city", and the scoring system 135 may associate a query score more indicative of confidence with such a how-to query. User's browsing history may additionally indicate that the user is searching for a new home in the city. Based at least in part on such additional user-initiated action, the video segmentation system 130 may identify a how-to query as "how do I find a new home in the city", and the scoring system 135 may associate a query score more indicative of confidence with such a how-to query. In some implementations scoring system 135 may increase the individual query scores for the how-to query "how do I find a new school in the city" and the how-to query "how do I find a new home in the city", based on the additional browsing history related to searching for new homes in the city.

In some implementations a selected how-to video may be provided in response to a query based on its query score. For example, a selected how-to video may be provided in response to a query if that query is associated with a query score that satisfies a threshold query score. The threshold query score may be indicative of sufficient confidence that the submitted query indicates a desire to receive a selected how-to video for completing a task indicated by the query. For example, if a query includes an inquiry term and a task term, then the query score of the query may satisfy the threshold. The video segmentation system 130 may access content database 120 to identify the associated how-to video and provide such selected how-to video in response to the submitted query.

As discussed, in some implementations the query score may be based on a sequence of queries. For example, a first query that includes a task term but does not include an inquiry term may not be identified as a how-to query and may be associated with a query score that does not satisfy the threshold query score. However, the user may submit a subsequent query that includes a task term that is similar to the task term of the first query (optionally in combination with an inquiry term). The query score for the subsequent query may take into account the first query and may satisfy the threshold query score. In some implementations the subsequent query immediately follows the first query. In some implementations the subsequent query may be within a threshold number of queries of the first query and/or submitted within a threshold of time of the first query. One or more additional subsequent queries may increase the confidence level of a query sequence and accordingly increase query scores for such subsequent queries. The video segmentation system 130 may access content database 120 to identify the associated how-to video and provide that in response to a query that satisfies the threshold query score.

The query score may be determined based on one or more additional and/or alternative factors. For example, standing alone, a given query that includes a task term but does not include an inquiry term may be associated with a query score that fails to satisfy the threshold query score. However, one or more user activities (e.g., purchase history, an email, and/or a post on a social media platform) may indicate that the user is likely to seek a selected how-to video related to completing the task. The query score may be adjusted based on one or more such user activities to be more likely to satisfy the threshold query score. For example, purchase history of a user may indicate that the user has recently bought a telescope. When taken in combination with a task term such as "adjust focus knob", it may be inferred that the user is searching for information related to focusing the telescope. Accordingly, the query score for the given query may be adjusted to reflect a query score more indicative of confidence that the user is searching for a selected how-to video related to focusing a telescope.

As another example, a given query may include a task term such as "change tire". Based solely on such given query, the scoring system 135 may associate a query score with the given query that fails to satisfy the threshold query score. However, user data may indicate that the user posted a comment on a social media platform that stated "stuck in the middle of nowhere with a flat tire." When taken in combination with the given query "change tire", it may be inferred that the user is searching for information related to changing a flat tire. Accordingly, the query score for the given query may be adjusted to reflect a query score that is more likely to satisfy the threshold query score.

In some implementations if a query score for a given query fails to satisfy a threshold query score, the video segmentation system 130 may prompt the user to see if the user desires a selected how-to video related to completing a task identified by the given query. For example, the given query may include a task term such as "change tire". In some implementations the video segmentation system 130 may prompt the user to determine if the user is searching for a selected how-to video to perform the task of changing a tire. If the user responds positively, then the selected how-to video may be provided. In some implementations user responses to such prompts may be stored in a database such as content database 120. If the number of positive user responses satisfies a certain threshold, then the given query may be associated with a query score more indicative of confidence that the given query is a how-to query. If the number of positive user responses fails to satisfy a certain threshold and/or the number of negative user responses satisfies a certain threshold, then the given query may be associated with a query score less indicative of confidence that the given query is a how-to query.

In some implementations the query score for a given query and the confidence measure for a selected how-to video (optionally modified based on the quality measure) related to the given query may be utilized in combination with one another to determine whether the selected how-to video may be provided in response to the given query or other actions of the user. For example, if both the query score for the given query and the confidence measure for the selected how-to video related to the given query satisfy certain respective thresholds, then the selected how-to video may be provided in response to the given query. On the other hand, if both the query score for the given query and the confidence measure for the selected how-to video related to the given query fail to satisfy certain respective thresholds, then the selected how-to video may not be provided in response to the given query. As another example, if the query score for the given query satisfies a certain first threshold and the confidence measure for the selected how-to video related to the given query fails to satisfy a certain second threshold, then the video segmentation system 130 may prompt the user to determine if the user is willing to receive the selected how-to video that are below the certain threshold. Based on the response to the prompt, the selected how-to video may or may not be provided in response to the given query. As another example, if the query score for the given query fails to satisfy a certain first threshold and the confidence measure for the selected how-to video related to the given query satisfies a certain second threshold, then the video segmentation system 130 may prompt the user to determine if the user is searching for a selected how-to video related to performing a task. Based on the response to the prompt, the selected how-to video may or may not be provided in response to the given query. As another example, if the query score for the given query fails to satisfy a certain first threshold and the confidence measure for the selected how-to video related to the given query indicates the selected how-to video is of very high quality, then the video segmentation system 130 may provide the selected how-to video and/or template.

In some implementations if a confidence measure associated with the selected how-to video responsive to a given query fails to satisfy a threshold relevance score or if a given query is not associated with a selected how-to video and/or template, the video segmentation system 130 may prompt the user for additional information to enable formulation of a query that will return a selected how-to video that satisfy a threshold relevance score. For example, a query of "how do I find my car oil filter" may be associated with a selected how-to video that may have a low confidence measure due to various car model specific oil filter placements. The video segmentation system 130 may prompt the user for additional information such as the car model, make, and/or year to enable formulation of a refined query that is associated with a selected how-to video that satisfy a threshold relevance score.

In some implementations where a number and/or percentage is utilized to determine a confidence measure, a relevance score, a quality measure, and/or a query score, the scoring system 135 may identify a threshold number and/or percentage to determine if the confidence measure, the relevance score, the quality measure and/or the query score satisfy such threshold. In some implementations the threshold may be a fixed threshold. In some implementations the threshold may be based on one or more of the task identified by the how-to query, the source, and the corpus of documents. For example, statistical analysis may be performed on a corpus of all documents related to a how-to query to determine a statistically significant threshold.

In situations in which the systems discussed herein collect personal information about users, or may make use of personal information, the users may be provided with an opportunity to control whether programs or features collect user information (e.g., information about a user's social network, email, social actions or activities, browsing history, a user's preferences, or a user's current geographic location), or to control whether and/or how to receive content from the content server that may be more relevant to the user. Also, certain data may be treated in one or more ways before it is stored or used, so that personally identifiable information may be removed. For example, a user's identity may be treated so that personally identifiable information may not be determined for the user, or a user's geographic location may be generalized where geographic location information may be obtained (such as to a city, ZIP code, or state level), so that a particular geographic location of a user may not be determined. Thus, the user may have control over how information is collected about the user and/or used.

The content database 120, the video segmentation system 130, the scoring system 135, and/or the search system 140 and/or may be implemented in hardware, firmware, and/or software running on hardware. For example, one or more of the systems may be implemented in one or more computer servers.

Many other configurations are possible having more or fewer components than the environment shown in FIG. 1. For example, in some environments the video segmentation system 130 may include a scoring system 135. In some environments the video segmentation system 130 and the scoring system 135 may be separate components.

Figure 8:
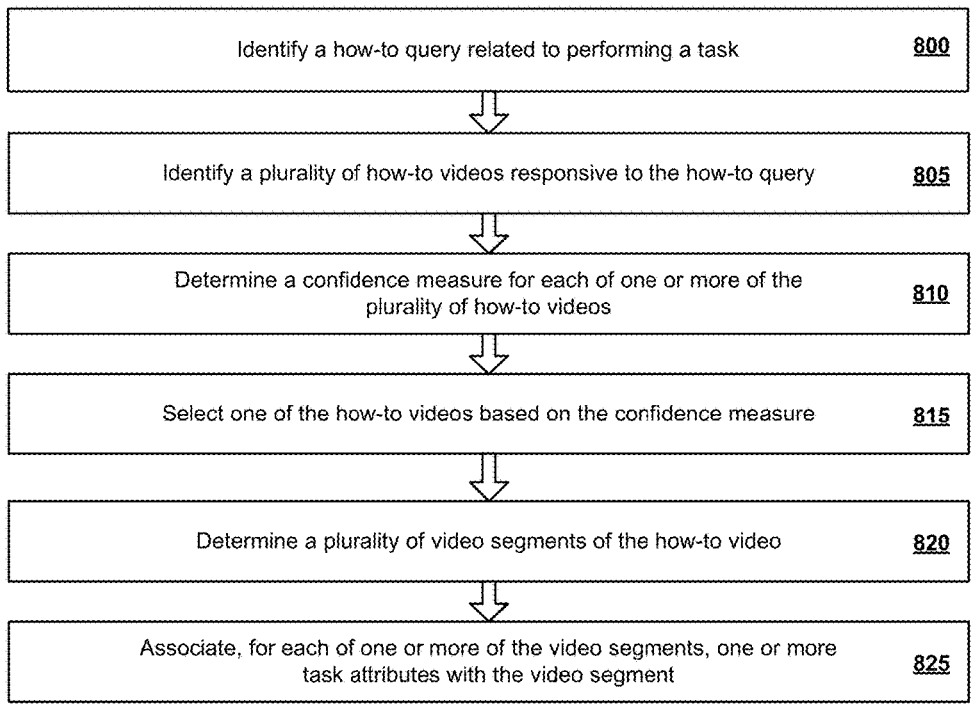
FIG. 8 is a flow chart illustrating an example method of determining a plurality of video segments of a selected how-to video into and associating the selected how-to video with the plurality of video segments.

Referring to FIG. 8, a flow chart illustrates an example method of determining a plurality of video segments of a selected how-to video into and associating the selected how-to video with the plurality of video segments. Other implementations may perform the steps in a different order, omit certain steps, and/or perform different and/or additional steps than those illustrated in FIG. 8. For convenience, aspects of FIG. 8 will be described with reference to a system of one or more computers that perform the process. The system may include, for example, the video segmentation system 130 of FIG. 1.

At step 800, a how-to query related to performing a task may be identified. A how-to query is a search query that identifies a task and that indicates a desire for information that may be utilized in performing the task. How-to queries include one or more task terms that identify a task and optionally include one or more inquiry terms that indicate a desire for instructions related to performing the task. For example, "how do I change a car tire" is an example of a how-to query that includes task terms ("change a car tire") that identify the task of changing a car tire and includes inquiry terms ("how do I") that are indicative of a desire for information that may be utilized in changing a car tire. As another example, "how do I focus a telescope" is an example of a how-to query that includes task terms ("focus a telescope") that identify the task of focusing a telescope and includes inquiry terms ("how do I") that are indicative of a desire for information that may be utilized in focusing a telescope.

In some implementations the video segmentation system 130 may additionally and/or alternatively identify a how-to query based on an image and/or other actions of the user. For example, a user may take a photo of a flat tire with client device 110, and the video segmentation system 130 may identify the photo of the flat tire and access a database to associate the photo with a how-to query such as "how do I change a car's tire?". As another example, a user may be wearing glasses equipped with a computing device and an application running on the wearable glasses may detect an image of a hand near a focus knob of a telescope. The video segmentation system 130 may identify the image of the hand near the focus knob of the telescope and access a database to associate the image with a how-to query.

At step 805, a plurality of how-to videos responsive to the how-to query may be identified. In some implementations content database 120 may include a collection of how-to videos responsive to identified how-to queries. For example, the search system 140 may identify search result documents that are responsive to a how-to query and an identifier for one or more of the search result documents may then be associated with the how-to query in the content database 120. In some implementations a how-to video may be associated with the how-to query based on a selection rate of the how-to video and/or an amount of time that one or more users spend viewing the how-to video after navigating to the how-to video. For example, how-to videos that have a relatively high selection rate and/or for which users spend a relatively high amount of time viewing may be more likely to be associated with the how-to query.

In some implementations the video segmentation system 130 may identify one or more video characteristics of a given video. In some implementations the video characteristics of the given video may include an audio and/or textual transcript of the given video. In some implementations the video segmentation system 130 may identify color characteristics of the given video. In some implementations the video segmentation system 130 may detect additional and/or alternative video characteristics including one or more of edge features (e.g., edge boundary for objects), face features (e.g., number of different faces), and audio features (e.g., number of different voices).

At step 810, a confidence measure may be determined for each of one or more of the plurality of how-to videos. The confidence measure for a given how-to video may be indicative of the effectiveness of the given video in providing correct and comprehensive completion steps for the task of the how-to query. In some implementations the video segmentation system 130 may include scoring system 135 that may determine the confidence measure for a given source. One or more factors may be utilized in determining the confidence measure of the given how-to video. For example, one or more existing rankings and/or one or more user reviews may be utilized in determining the confidence measure of the given how-to video. In some implementations one or more user comments related to the given how-to video may be utilized in determining the confidence measure of the given how-to video. One or more rankings from social media platforms may also be utilized in determining the confidence measure of the given how-to video. Video characteristics such as the image and/or sound quality may be utilized to determine the confidence measure of the given how-to video. One or more of the video characteristics may be combined to determine the confidence measure of the given how-to video.

At step 815, one of the how-to videos may be selected based on the confidence measure. In some implementations the how-to videos may be ranked based on the confidence measure and the top ranked how-to video may be selected. A plurality of video segments of the how-to video may be determined as discussed herein. In some implementations video segments may be determined only for the selected how-to video. In some implementations a threshold may be identified based on the confidence measure and video segments may be determined for the one or more how-to videos (of the plurality of how-to videos) that are associated with confidence measures that satisfy the threshold. In some implementations video segments may be determined for each how-to video in the plurality of how-to videos.

At step 820, a plurality of video segments of the how-to video may be determined. In some implementations an audio and/or textual transcript of the how-to video may be utilized to determine the video segments. In some implementations video text may be utilized. For example topic change markers may be identified in closed caption annotators and utilized to determine video segments. Transitional terms such as "first", "next", "followed by", "after", "at the outset", "finally", "step", "moving on", "next part", "other step", "previous step", "in conclusion", etc. may be optionally utilized as topic change markers.

In some implementations transitional indicators of the video that include transitional terms may be identified and utilized to determine video segments. In some implementations shot transitions in the video may be utilized to determine one or more transitional indicators. For example, hard cuts, fades, and dissolves may be identified as transitional indicators. Stop lists and stemming may be optionally utilized to remove words and phrases that may be determined to be unlikely to have any distinguishing features. Identified noise may be removed from the how-to video to identify useful content. For example, commercial content and/or other content unrelated to the task may be removed from the how-to video. In some implementations one or more additional and/or alternative video characteristics may be utilized to determine the video segments such as those discussed herein.

At step 825, for each of one or more of the video segments, one or more task attributes may be associated with the video segment. For example, each step in a determined set of steps to perform the task may be associated with a distinct video segment that displays how to perform the associated step in the set of steps. As another example, an introduction may be associated with a video segment that introduces the task. Also, for example, the tools and/or their description may be associated with a video segment that may show images and/or describe the tools needed to perform the task.

In some implementations additional task attributes may be identified from a plurality of additional sources. The additional task attributes may relate to one or more aspects of the task based on the plurality of additional sources. The additional task attributes may be distinct from the task attributes included in the selected how-to video. In some implementations information related to the additional task attributes may be provided in combination with one or more video segments in response to a submitted query.

Figure 9:
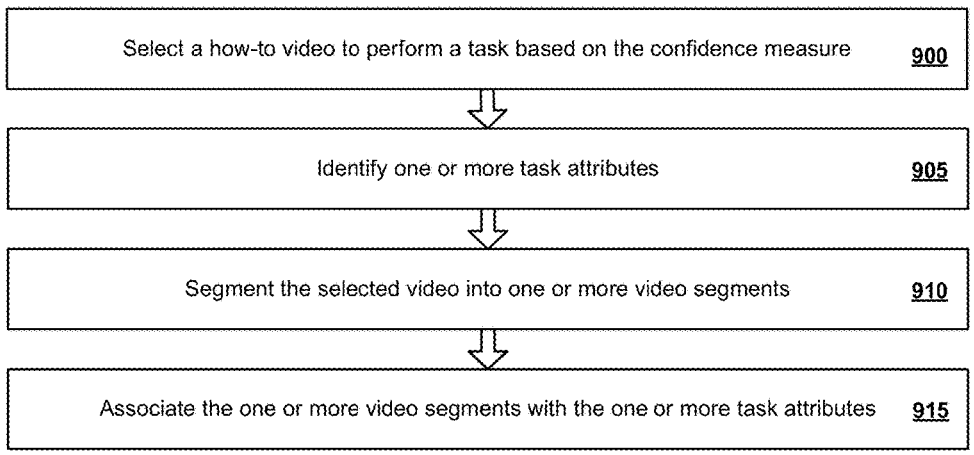
FIG. 9 is a flow chart illustrating another example method determining video segments of a selected how-to video.

Referring to FIG. 9, a flow chart illustrates an example method of determining video segments of a selected how-to video. Other implementations may perform the steps in a different order, omit certain steps, and/or perform different and/or additional steps than those illustrated in FIG. 9. For convenience, aspects of FIG. 9 will be described with reference to a system of one or more computers that perform the process. The system may include, for example, the video segmentation system 130 of FIG. 1.

At step 900, a how-to video may be selected to perform a task based. The selection may be based on the confidence measure. In some implementations the how-to videos may be ranked based on the confidence measure and the top ranked how-to video may be selected. A plurality of video segments of the how-to video may be determined as discussed herein. In some implementations video segments may be determined only for the selected how-to video. In some implementations a threshold may be identified based on the confidence measure and video segments may be determined for the one or more how-to videos (of the plurality of how-to videos) that are associated with confidence measures that satisfy the threshold. In some implementations video segments may be determined for each how-to video in the plurality of how-to videos. Step 900 may share one or more attributes in common with step 815 of FIG. 8.

At step 905, one or more task attributes may be identified. Task attributes for the task may include one or more of a title, skill level to perform the task, average time required to perform the task and/or perform a portion of the task, tools and/or materials needed, a set of steps to perform the task, and one or more sources of information for the task attributes. In some implementations task attributes may be identified from a textual transcript of the how-to video. For example, the video segmentation system 130 may identify a video manual and extract the one or more steps from the textual transcript of the video manual. In some implementations the video segmentation system 130 may utilize the confidence measure to rank the one or more how-to videos and select the how-to video with the highest confidence measure as a source for the task attributes related to performing the task. In some implementations the video segmentation system 130 may access content database 120 to identify task attributes related to performing the task.

In some implementations task attributes may be identified from a textual transcript of the selected how-to video. In some implementations the video segmentation system 130 may identify a plurality of sources (not necessarily video sources) and extract one or more task attributes from such sources. For example, the video segmentation system 130 may identify sources A, B, C, and D. In some implementations these sources may be ranked based on one or more criteria, including criteria similar to the confidence measure. The video segmentation system 130 may identify one or more task attributes including sets of steps from sources A and B. If sources A and B are how-to-videos, then the sets of steps may be identified from the textual transcripts of the how-to videos. For example, source A may be identified to include steps {A1, A2, . . . , A5} and source B may be identified to include steps {B1, B2, . . . , B6}. The video segmentation system 130 may select steps A1, A2 from source A, followed by steps B2, B4, and B6 from source B, and steps A5 and A8 from source A. Accordingly, the determined set of steps may be {A1, A2, B2, B4, B6, A5, A8}.

As another example, the title associated with the task may be identified in one or more ways such as identifying the title from the video text, from the audio, from an instruction manual, from transcripts of the video and/or audio, and so forth. In some implementations the title may be based on the how-to query itself. For example, if the how-to query states "how do I focus a telescope", the video segmentation system 130 may identify the title as "Focusing a telescope". In some implementations one or more inquiry terms of a how-to query (e.g., "how to") may be combined with one or more task term (e.g., "telescope" and "focus knob") to determine a title (e.g., "How to focus a telescope"). In some implementations the title may be based on an anchor text of one or more sources from which the set of steps is determined. For example, the anchor-text associated with a primary source from which the how-to video is selected may state "Learn more about how to focus a telescope", and the video segmentation system 130 may identify the title as "Focusing a telescope".

At step 910, a plurality of video segments of the how-to video may be determined. As discussed herein, in some implementations an audio and/or textual transcript of the how-to video may be utilized to determine the video segments. In some implementations video text may be utilized. For example topic change markers may be identified in closed caption annotators. Step 910 may share one or more attributes in common with step 820 of FIG. 8.

At step 915, the one or more video segments may be associated with the one or more task attributes. For example, a first video segment may be associated with skill requirement, a second video segment may be associated with time requirement, a third video segment may be associated with tools needed, a fourth video segment may be associated with materials needed, a fifth video segment may be associated with a first step of the set of steps, a sixth video segment may be associated with a second step of the set of steps, and so forth.

In some implementations the user may navigate the selected how-to video by choosing to view one or more video segments. For example, a user may issue the query "how do I change my car's tire?" and the search system 140 may access content database 120 and provide the associated how-to video to the user. The user may have already parked the car, taken out the tools and the spare, and may want to see how to position the jack under the car. The user may select the video segment associated with the step that describes how to position the jack and directly view that video segment. Step 915 may share one or more attributes in common with step 825 of FIG. 8.

Figure 10:
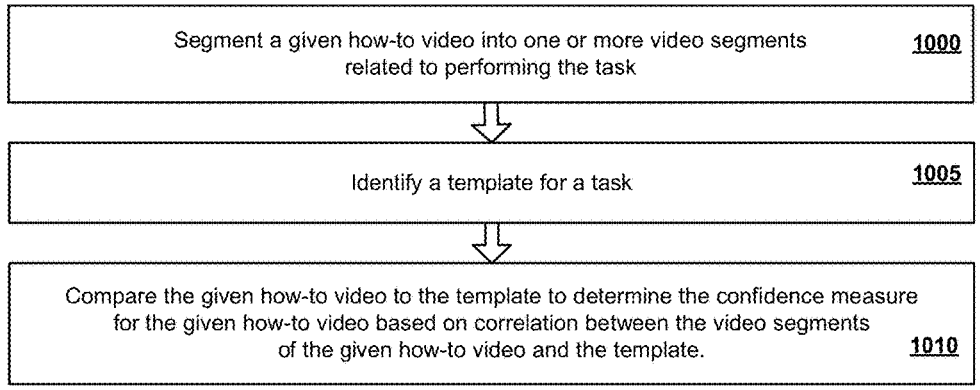
FIG. 10 is a flow chart illustrating an example method of determining a confidence measure for a how-to video based on comparison with an identified template.

Referring to FIG. 10, a flow chart illustrates an example method of determining a confidence measure for a how-to video based on comparison with an identified template. Other implementations may perform the steps in a different order, omit certain steps, and/or perform different and/or additional steps than those illustrated in FIG. 10. For convenience, aspects of FIG. 10 will be described with reference to a system of one or more computers that perform the process. The system may include, for example, the video segmentation system 130 of FIG. 1.

At step 1000, a plurality of video segments may be determined for a given how-to video. For example, the color histogram may be utilized to compare successive frames and arrange the frames into groups and one or more video segments may be derived from each such group. Similar frames will generally share similar color characteristics. For example, in a how-to video for changing a car's tire, the frames that capture a wrench being utilized to unscrew the wheel will generally share similar color characteristics. On the other hand such frames will generally differ in color characteristics from frames that capture the car being lifted with a jack.

Additional and/or alternative video characteristics may be utilized to determine the video segments. For example, motion characteristics of the video, such as identifying motion vectors and determining motion flow based on a gradient flow, may be utilized to identify video segments. For example, in a how-to video for focusing a telescope, the frames that capture the focus knob of a telescope being turned in one direction will generally share similar motion characteristics. On the other hand such frames will generally differ in motion characteristics from frames that capture the focus knob of a telescope being turned in an opposite direction. The gradient flow may be analyzed and quantitatively grouped to identify transitional indicators and/or video segments. For example, critical values of the gradient flow may correspond to transitional indicators and the gradient flow between two critical values may represent a video segment. Object segmentation techniques, image analysis techniques, scene changes, and change characteristics of speech and/or music may be additionally and/or alternatively utilized to identify the video segments. Step 1000 may share one or more attributes in common with step 820 of FIG. 8 and/or step 910 of FIG. 9.

At step 1005, a template may be identified for a task. In some implementations the template may be based on the video segments of the how-to video. The template may be a list of task attributes related to the task. For example, the template may list the tools needed and the steps needed to perform the task. As another example, the template may list the tools, materials, average time taken, and the steps needed to perform the task. In some implementations the template may identify the number of tools, the number of steps, the average difficulty of performing each step, and so forth. In some implementations the template may be a determined set of steps responsive to the task. In some implementations the template may be an outline for a conforming video responsive to the task. For example, the template may be in the form of a relational database with one or more structural elements related to the task. The structural elements may be for "<Task>", "<Query>", "<Title>", "<Tools>", "<Steps>", and so forth. One or more structural elements in the template may be hyperlinked to one or more sources that contribute to the identification of such structural elements. The template may be additionally and/or alternatively associated with tags and/or metadata.

In some implementations the templates associated with similar how-to queries may be reformulated into corresponding canonical representations using canonicalization rules. The canonicalization of the templates enables the mapping of similar how-to queries that represent similar information requests and that share a number of terms having the same or similar form. Canonicalization of the templates may also enable the mapping of dissimilar how-to queries that represent dissimilar information requests, but that share a number of terms having the same or similar form.

At step 1010, the given how-to video may be compared to the template to determine the confidence measure for the given how-to video, the confidence measure being indicative of correlation between the video segments of the given how-to video and the template. One or more measures of similarity may be utilized to compare the how-to video to the template. A higher similarity measure between the how-to video and the template may be associated with a confidence measure more indicative of confidence of the how-to video.

For example, the template may indicate that a task requires six distinct steps. The given how-to video may be analyzed to determine if the six distinct steps are present in the video. In some implementations one or more video segments of the how-to video may be utilized to make such a determination. A confidence measure more indicative of confidence may be associated with the given how-to video if all six distinct steps are identified in the how-to video than if fewer than six steps are identified. As another example, the template may indicate that the task may be associated with seven identified tools and three identified materials. A confidence measure more indicative of confidence may be associated with the given how-to video if seven identified tools and three identified materials are identified in the how-to video than if fewer than seven identified tools and/or three identified materials are identified.

Figure 11:
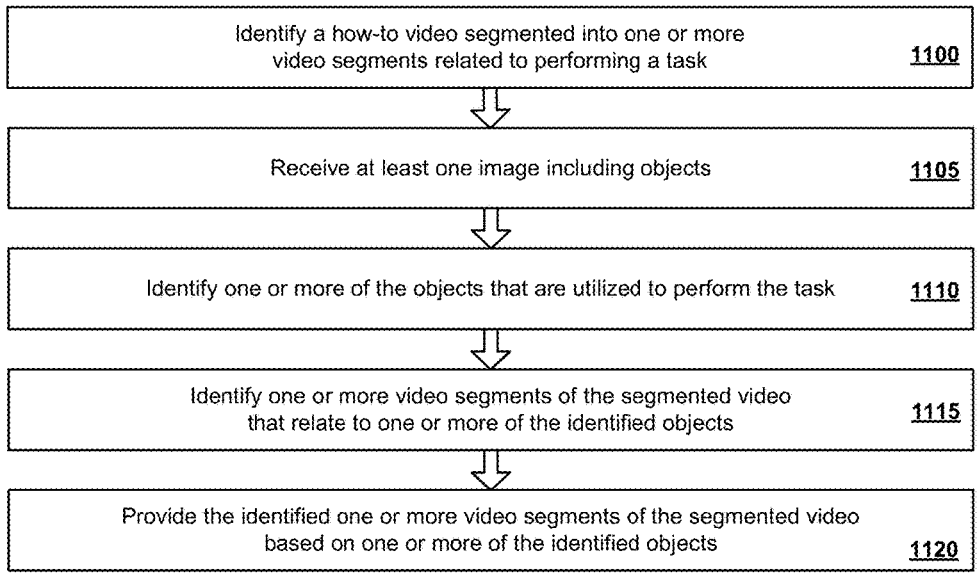
FIG. 11 is a flow chart illustrating an example method of identifying an object utilized to perform a task and providing one or more video segments of a how-to video based on the identified object.

Referring to FIG. 11, a flow chart illustrates an example method of identifying an object utilized to perform a task and providing one or more video segments of a how-to video based on the identified object. Other implementations may perform the steps in a different order, omit certain steps, and/or perform different and/or additional steps than those illustrated in FIG. 11. For convenience, aspects of FIG. 11 will be described with reference to a system of one or more computers that perform the process. The system may include, for example, the video segmentation system 130 of FIG. 1.

At step 1100, a how-to video may be identified, the how-to video segmented into one or more video segments related to performing a task. For example, the how-to video may be identified from a database of stored videos that have been indexed, annotated, and/or segmented. In some implementations the one or more video segments may be determined based on one or more techniques disclosed herein. Step 1100 may share one or more attributes in common with step 820 of FIG. 8, step 910 of FIG. 9 and/or step 1000 of FIG. 10.

At step 1105, at least one image including objects may be received. The object may be received via one or more client devices 110. For example, a user may take a photograph and/or a video with a tablet device. As another example, the user may take a photograph and/or a video with a smartphone. As another example, the user may be wearing glasses equipped with a camera and a computing device. As the user attempts to focus a telescope, the glasses may take one or more photographs and/or capture a video of the user attempting to focus the telescope. The computing device in the wearable glasses may provide these images and/or stream the video to the video segmentation system 130.

At step 1110, one or more of the objects that are utilized to perform the task may be identified. In some implementations the identification may be performed by an application running on the user's mobile device 110. In some implementations the identification may be performed by the video segmentation system 130. For example, the user may be trying to focus a telescope and a wearable glass worn by the user may stream a video to the video segmentation system 130. The video segmentation system 130 may identify the focus knob of the telescope and access content database 120 to identify that the user may be trying to focus the telescope.

At step 1115, one or more video segments relate to one or more of the identified objects may be identified. For example, the video segmentation system 130 may identify the how-to query as "how do I focus the telescope" and access content database 120 to identify an associated how-to video. In some implementations the video segmentation system 130 may identify one or more steps in an associated set of steps that utilize the focus knob. In some implementations the video segmentation system 130 may identify one or more video segments (that utilize the focus knob) in the associated how-to video.

At step 1120, the identified one or more video segments based on one or more of the identified objects may be provided to the user. For example, the identified video segment that illustrates how to turn the focus knob may be provided to the user on a client device 110. The user may view the video segment and complete that particular step in the set of steps to focus the telescope. As another example, the identified video segment may be provided to the user on the wearable glasses. In some implementations the images from the video segment may be overlaid onto the focus knob and the telescope to provide real-time directions to focus the telescope. In some implementations the user may be provided more than one video segment to choose from. For example, the user may be changing a tire and the video segmentation system 130 may identify a wrench. The video segmentation system 130 may identify one or more video segments (that may be associated with the wrench) in the how-to video associated with the how-to query "how do I change the car's tire". For example, a wrench may be used in the step related to removing the flat tire and in the step related to mounting and fixing the spare tire. The user may be provided video segments corresponding to each step and the user may choose the particular video segment depending on which step the user may be at in changing the tire. For example, if the user has already removed the flat tire and is mounting the spare tire, the user may select the video segment associated with the step related to mounting and fixing the spare tire.

Figure 12:
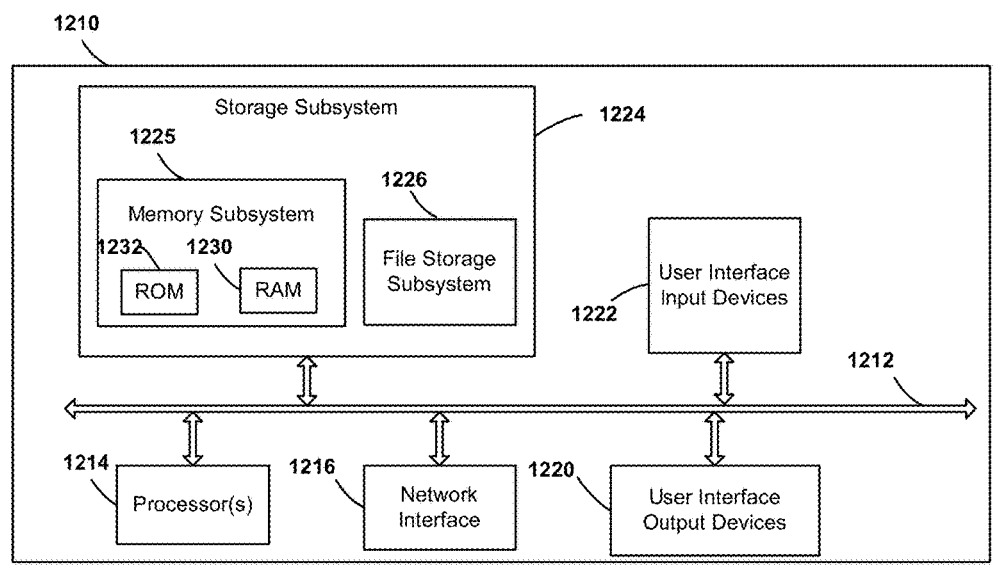
FIG. 12 illustrates a block diagram of an example computer system.

FIG. 12 is a block diagram of an example computer system 1210. Computer system 1210 typically includes at least one processor 1214 which communicates with a number of peripheral devices via bus subsystem 1212. These peripheral devices may include a storage subsystem 1224, including, for example, a memory subsystem 1225 and a file storage subsystem 1226, user interface input devices 1222, user interface output devices 1220, and a network interface subsystem 1216. The input and output devices allow user interaction with computer system 1210. Network interface subsystem 1216 provides an interface to outside networks and is coupled to corresponding interface devices in other computer systems.

User interface input devices 1222 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1210 or onto a communication network.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1210 to the user or to another machine or computer system.

Storage subsystem 1224 stores programming and data constructs that provide the functionality of some or all of the modules described herein. For example, the storage subsystem 1224 may include the logic to identify the how-to video that may be associated with a how-to query. As another example, the storage subsystem 1224 may include the logic to segment a how-to video into video segments.

These software modules are generally executed by processor 1214 alone or in combination with other processors. Memory 1225 used in the storage subsystem can include a number of memories including a main random access memory (RAM) 1230 for storage of instructions and data during program execution and a read only memory (ROM) 1232 in which fixed instructions are stored. A file storage subsystem 1226 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 1226 in the storage subsystem 1224, or in other machines accessible by the processor(s) 1214.

Bus subsystem 1212 provides a mechanism for letting the various components and subsystems of computer system 1210 communicate with each other as intended. Although bus subsystem 1212 is shown schematically as a single bus, alternative implementations of the bus subsystem may use multiple busses.

Computer system 1210 can be of varying types including a workstation, server, computing cluster, blade server, server farm, or any other data processing system or computing device. Due to the ever-changing nature of computers and networks, the description of computer system 1210 depicted in FIG. 12 is intended only as a specific example for purposes of illustrating some implementations. Many other configurations of computer system 1210 are possible having more or fewer components than the computer system depicted in FIG. 12.

While several inventive implementations have been described and illustrated herein, a variety of other means and/or structures for performing the function and/or obtaining the results and/or one or more of the advantages described herein may be utilized, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein in the specification and in the claims, the term "database" will be used broadly to refer to any collection of data. The data of the database does not need to be structured in any particular way, or structured at all, and it can be stored on storage devices in one or more geographic locations.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer implemented method, comprising:
   identifying, by one or more computer systems, a plurality of how-to videos for a task;
   identifying, by one or more of the computer systems, a plurality of steps for the task from at least one source that is in addition to the how-to videos;
   determining, by one or more of the computer systems, a confidence measure for a how-to video of the how-to videos based on similarity between a progression of the how-to video and a desired progression, wherein the desired progression defines at least a sequence for performing the steps for the task;
   selecting, by one or more of the computer systems, the how-to video based on the confidence measure;
   determining, by one or more of the computer systems, a plurality of video segments of the how-to video, wherein determining the video segments comprises determining step video segments of the video segments that each correspond to a corresponding one of the steps for the task;
   associating, by one or more of the computer systems, the step video segments with the corresponding steps for the task;
   receiving, by one or more of the computer systems, a submitted query associated with the task; and
   providing, by one or more of the computer systems in response to the query, the steps for the task along with links to the corresponding step video segments.

2. The method of claim 1, wherein selecting the how-to video based on the confidence measure comprises selecting the how-to video based on the confidence measure satisfying a threshold.

3. The method of claim 1, wherein determining the confidence measure for the how-to video is further based on a measure of popularity of the how-to video.

4. The method of claim 1, wherein determining the confidence measure for the how-to video is further based on comparing tools or materials identified in the how-to video to desired tools or desired materials for the task, the desired tools or desired materials for the task being identified based on the at least one source that is in addition to the how-to videos.

5. The method of claim 1, further comprising:
   providing, by one or more of the computer systems in response to the query, a visual indication of the confidence measure of the how-to video along with the steps for the task and the links to the corresponding video segments.

6. The method of claim 1, further comprising:
   determining, by one or more of the computer systems, a query score for the submitted query, wherein the query score is indicative of confidence that the submitted query indicates a desire to receive how-to steps for completing the task;
   wherein providing the steps for the task along with links to the corresponding video segments is based on the query score for the submitted query.

7. The method of claim 6, wherein providing the steps for the task along with links to the corresponding video segments is further based on the confidence measure for the how-to video.

8. The method of claim 6, wherein determining the query score is based on whether the submitted query includes an inquiry term.

9. The method of claim 6, wherein determining the query score is based on one or more preceding queries submitted prior to the submitted query by a user that submitted the submitted query.

10. The method of claim 6, wherein determining the query score is based on one or more computing actions that occurred prior to the submitted query, the computing actions initiated by a user that submitted the submitted query.

11. The method of claim 1, further comprising:
    determining, by one or more of the computer systems, the desired progression based on the at least one source that is in addition to the how-to videos.

12. The method of claim 1, further comprising providing one or more of the step video segments in response to the submitted query.

13. The method of claim 12, wherein the submitted query includes one or more images.

14. The method of claim 12, wherein providing the step video segments includes overlaying, on a display, images based on one of the step video segments onto an object that is utilized to perform the task and that is presented on the display.

15. The method of claim 14, further comprising:
    receiving, by one or more of the computer systems, at least one image including the object;
    identifying, by one or more of the computer systems, the object;
    identifying, by one or more of the computer systems, the one step video segment based on an associated attribute of the one video segment identifying the object; and
    determining, by one or more of the computer systems, the images based on the one video segment.

16. The method of claim 1, further comprising:
    determining, by one or more of the computer systems, additional task attributes related to one or more aspects of the task, wherein the additional task attributes are distinct from task attributes included in the selected how-to video; and
    providing, by one or more of the computer systems, information related to the additional task attributes in combination with the steps for the task and the links to the corresponding step video segments.

17. A system, comprising:
memory storing instructions; and
one or more processors operable to execute the instructions stored in the memory, wherein the instructions comprise instructions to:
- identify a plurality of how-to videos for a task;
- identify a plurality of steps for the task from at least one source that is in addition to the how-to videos;
- determine a confidence measure for a how-to video of the how-to videos based on similarity between a progression of the how-to video and a desired progression, wherein the desired progression defines at least a sequence for performing the steps for the task;
- select the how-to video based on the confidence measure;
- determine a plurality of video segments of the how-to video, wherein the instructions to determine the video segments comprise instructions to determine step video segments of the video segments that each correspond to a corresponding one of the steps for the task;
- associate, in one or more databases, the step video segments with the corresponding steps for the task;
- receive a submitted query associated with the task; and
- provide, in response to the query, the steps for the task along with links to the corresponding step video segments.

18. The system of claim 17, wherein the instructions to determine the confidence measure for the how-to video include instructions to determine the confidence measure further based on comparing tools or materials identified in the how-to video to desired tools or desired materials for the task, the desired tools or desired materials for the task being identified based on the at least one source that is in addition to the how-to videos.

19. The system of claim 17, wherein the instructions further comprise instructions to:
- provide, in response to the query, a visual indication of the confidence measure of the how-to video along with the steps for the task and the links to the corresponding video segments.

20. The system of claim 17, wherein the instructions further comprise instructions to:
- determine a query score for the submitted query, wherein the query score is indicative of confidence that the submitted query indicates a desire to receive how-to steps for completing the task;
- wherein the instructions to provide the steps for the task along with links to the corresponding video segments include instructions to provide the steps for the task along with links to the corresponding video segments based on the query score for the submitted query.

* * * * *